United States Patent
Nakagawa et al.

(10) Patent No.: US 7,062,902 B2
(45) Date of Patent: Jun. 20, 2006

(54) ENGINE CONTROL EQUIPMENT

(75) Inventors: Shinji Nakagawa, Chiyoda-ku (JP); Minoru Ohsuga, Chiyoda-ku (JP); Shiro Yamaoka, Chiyoda-ku (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/926,139

(22) Filed: Aug. 26, 2004

(65) Prior Publication Data
US 2005/0109018 A1 May 26, 2005

Related U.S. Application Data

(63) Continuation of application No. 10/157,227, filed on May 30, 2002, now abandoned, which is a continuation of application No. 09/811,696, filed on Mar. 20, 2001, now abandoned.

(30) Foreign Application Priority Data

Aug. 2, 2000 (JP) .............................. 2000-234695

(51) Int. Cl.
*F01N 3/00* (2006.01)

(52) U.S. Cl. .................... 60/285; 60/284; 60/300; 123/299; 123/300

(58) Field of Classification Search ................ 60/284, 60/285, 286, 300; 123/299, 300
See application file for complete search history.

(56) References Cited

U.S. PATENT DOCUMENTS

| | | | | |
|---|---|---|---|---|
| 5,839,273 A | * | 11/1998 | Maus | 60/284 |
| 5,890,360 A | * | 4/1999 | Sasaki et al. | 60/278 |
| 6,213,086 B1 | * | 4/2001 | Chmela et al. | 123/DIG. 7 |
| 6,230,683 B1 | * | 5/2001 | Zur Loye et al. | 123/435 |
| 6,237,562 B1 | * | 5/2001 | Awasaka et al. | 123/305 |
| 6,240,721 B1 | * | 6/2001 | Ito et al. | 60/284 |
| 6,240,723 B1 | * | 6/2001 | Ito et al. | 60/278 |
| 6,276,334 B1 | * | 8/2001 | Flynn et al. | 123/435 |
| 6,293,246 B1 | * | 9/2001 | Tanahashi et al. | 123/305 |
| 6,354,264 B1 | * | 3/2002 | Iwakiri et al. | 123/305 |
| 6,536,209 B1 | * | 3/2003 | Fluga et al. | 60/284 |
| 6,804,952 B1 | * | 10/2004 | Sasaki et al. | 60/284 |
| 6,865,880 B1 | * | 3/2005 | Iihoshi et al. | 60/285 |

FOREIGN PATENT DOCUMENTS

| | | |
|---|---|---|
| JP | 62-157220 | 7/1987 |
| JP | 11-6435 | 1/1999 |
| JP | 11-62589 | 3/1999 |
| JP | 11-166435 | 6/1999 |
| JP | 11-257108 | 9/1999 |
| JP | 11-294152 | 10/1999 |
| JP | 11-336574 | 12/1999 |
| JP | 11-336600 | 12/1999 |
| JP | 2000-38948 | 2/2000 |
| JP | 2000-45844 | 2/2000 |

* cited by examiner

*Primary Examiner*—Tu M. Nguyen
(74) *Attorney, Agent, or Firm*—Crowell & Moring LLP

(57) ABSTRACT

An engine control equipment capable of activating a catalyst and preventing exhaust gas from deteriorating in order to early perform combustion by compressive self-ignition is disclosed. The engine control equipment is an engine control equipment including a catalyst for burning a mixed gas in a combustion chamber by compressive self-ignition and purifying exhaust-gas components in the combustion chamber and a controller for controller the catalyst which determines the activation of the catalyst and activates the catalyst in accordance with a determination result based upon determining the activation of the catalyst.

21 Claims, 25 Drawing Sheets

ENGINE CONTROL EQUIPMENT

BACKGROUND OF THE INVENTION

The present invention relates to an engine control equipment, particularly to a control equipment of a compressive self-ignition engine for accelerating activation of a catalyst.

A car engine has such main problems as improvement of fuel consumption and reduction of exhaust gas. A lean burn engine has recently become a mainstream, which uses a combustion system according spark ignition to improve the fuel consumption by operating an air-fuel ratio at a lean in order to reduce a pump loss.

However, though the spark-ignition-type lean burn engine can reduce the pump loss by making an air-fuel ratio leaner, there is a lean limit due to an ignition error according to the theory of the engine because the engine uses combustion according to flame spread.

However, there is a combustion-type engine according to the compressive self-ignition of making a fuel-air mixture spontaneously ignite in a combustion chamber instead of using the spark ignition by a spark plug. The compressive-self-ignition engine causes a combustion reaction everywhere in the combustion chamber. Therefore, it is possible to improve the fuel consumption and thereby reduce NOx because the engine has a lean limit higher than that of the spark-ignition type and moreover, there is no local high-temperature portion and the combustion temperature is low.

Moreover, in the case of a usual engine, it is generally performed to make an exhaust pipe of the engine oxidize hydrocarbon (HC) and carbon monoxide (CO) contained in the exhaust gas discharged from a combustion chamber and set a three-way catalyst having a function for reducing an nitrogen oxide (NOx). In the case of the three-way catalyst, the NOx reducing function of the three-way catalyst hardly functions in a lean operation as shown by the purifying performance of three components of a three-way catalyst to the air-fuel ratio in FIG. 34. Therefore, an NOx catalyst may be set which occludes or adsorbs NOx.

In the case of a compressive-self-ignition-combustion-type engine, it is necessary to greatly increase the combustion chamber in pressure and temperature. Therefore, various arts about an engine control equipment for changing the spark ignition type and the compressive self-ignition type in accordance with an engine operating condition in which spark ignition using a spark plug is performed when warming-up of the engine is not completed and the compressive self-ignition combustion is performed in the cases other than the above case or the compressive self-ignition combustion is performed when the compressive self-ignition combustion can be made and an ignition timing can be properly obtained are disclosed (refer to official gazettes of Japanese Patent Laid-Open Nos. 157220/1987, 6435/1999, 336600/1999, 62589/1999, 257108/1999, 166435/1999, and 294152/1999).

Moreover, by considering that the purifying performance of an exhaust gas by a three-way catalyst is lowered when an engine is cooled, various arts of an engine control equipment for accelerating activation of the catalyst are disclosed (refer to official gazettes of Japanese Patent Laid-Open Nos. 45844/2000 and 336574/1999).

As shown in FIG. 35, the above three-way catalyst shows HC, CO, and NOx purifying functions when an exhaust gas has a predetermined temperature or higher. However, the catalyst has a characteristic that it cannot completely purify the exhaust gas when the exhaust gas has a temperature lower than the predetermined temperature. Therefore, it is necessary to keep the exhaust gas at a predetermined temperature or higher in order to maintain the above activated state. That is, as shown in FIG. 36, in the case of the three-way catalyst set to the exhaust pipe, the exhaust-gas purifying performance of the catalyst is deteriorated in the period from the time when an engine is started until the time when an exhaust gas reaches a predetermined temperature or higher. This is because the engine has the temperature equal to the then outside-air temperature when it is started and the temperature of its exhaust gas is also low, and the catalyst is activated after it is heated by the exhaust gas.

Therefore, when setting a catalyst to the exhaust pipe, it is necessary to shorten the time from start of an engine up to activation of the catalyst, that is, any means for activating the catalyst is necessary.

The above mentioned is particularly necessary for a combustion-type engine according to compressive self-ignition. The is because in the case of the combustion type according to compressive self-ignition, the combustion temperature is lower than the case of the spark ignition type and thereby, the effect of raising the temperature of a catalyst by heating an exhaust gas is small. Therefore, exhaust-gas deterioration becomes a large problem at start of the engine.

That is, the present inventor obtains the new knowledge that when setting a catalyst to the exhaust pipe of a combustion-type engine according to compressive self-ignition, it is possible to shorten the time from start of the engine up to activation of the catalyst and therefore, it is possible to prevent exhaust-gas deterioration also in the case of the combustion type according to compressive self-ignition.

However, though the above prior art has means for changing the spark-ignition type and the compressive self-ignition type, the engine control equipments disclosed in the official gazettes of Japanese Patent Laid-Open Nos. 157220/1987 and 6435/1999 notice only a combustion state, determine directly or indirectly whether the combustion state allows compressive self-ignition, and permit the combustion by compressive self-ignition when the combustion state allows the compressive self-ignition. Therefore, when combustion by compressive self-ignition can be made even if a catalyst is inactivated, compressive self-ignition combustion may be performed. Moreover, other prior arts do not particularly consider activating a catalyst in order to early perform the combustion by compressive self-ignition though they respectively control the opening/closing timing of an intake or exhaust valve in accordance with the operation state or heat a catalyst in order to reduce smoke and NOx at the same time.

The present invention is made to solve the above problems and its object is to provide an engine control equipment capable of preventing an exhaust gas from deteriorating by activating a catalyst in order to early perform the combustion by compressive self-ignition.

To achieve the above object, an engine control equipment of the present invention is an engine control equipment basically having a catalyst for burning a mixed gas in a combustion chamber by compressive self-ignition and purifying exhaust-gas components in the combustion chamber. The control equipment is provided with means for controlling the catalyst and the means for controlling the catalyst is provided with means for determining the activated state of the catalyst and means for activating the catalyst in accordance with a determination result of the means for determining the activated state of the catalyst.

In the case of the engine control equipment of the present invention constituted as described above, the means for activating a catalyst accelerates the activation of the catalyst in accordance with a determination result of a catalyst state. Therefore, it is possible to shorten the time from start of an engine up to activation of a catalyst, prevent an exhaust gas for activating the catalyst from deteriorating, and improve the reliability of the engine.

Moreover, in the case of a specific mode of an engine control equipment of the present invention, the means for determining the activated state of the catalyst is provided with means for detecting or estimating the temperature of the catalyst and means for determining the activation of the catalyst. The means for activating the catalyst controls the operation state of an engine when the detected or estimated temperature of the catalyst is equal to or lower than a predetermined value.

In the case of another mode of the engine control equipment of the present invention, the means for activating the catalyst inhibits the combustion by the compressive self-ignition and performs the combustion by spark ignition when the detected or estimated temperature of the catalyst is equal to or lower than a predetermined value.

In the case of still another mode of the engine control equipment of the present invention, the means for activating the catalyst drives a heater for the catalyst when the detected or estimated temperature of the catalyst is equal to or lower than a predetermined value.

In the case of still another mode of the engine control equipment of the present invention, the means for activating the catalyst injects a fuel at the timing other than usual fuel injection when the detected or estimated temperature of the catalyst is equal to or lower than the predetermined value and the fuel injection timing coincides with the explosion or exhaust stroke of the engine.

Moreover, an engine control equipment of the present invention is controlled so as to early perform the combustion by the compressive self-ignition when a temperature detected by a temperature sensor provided for the upstream or downstream side of the above catalyst shows a predetermined value or higher and the catalyst uses a three-way catalyst or NOx catalyst set to an exhaust pipe.

DETAILED DESCRIPTION OF THE PREFERRED EMBODIMENTS

Embodiments of an engine control equipment of the present invention are described below in detail by referring to the accompanying drawings.

Figure 1:
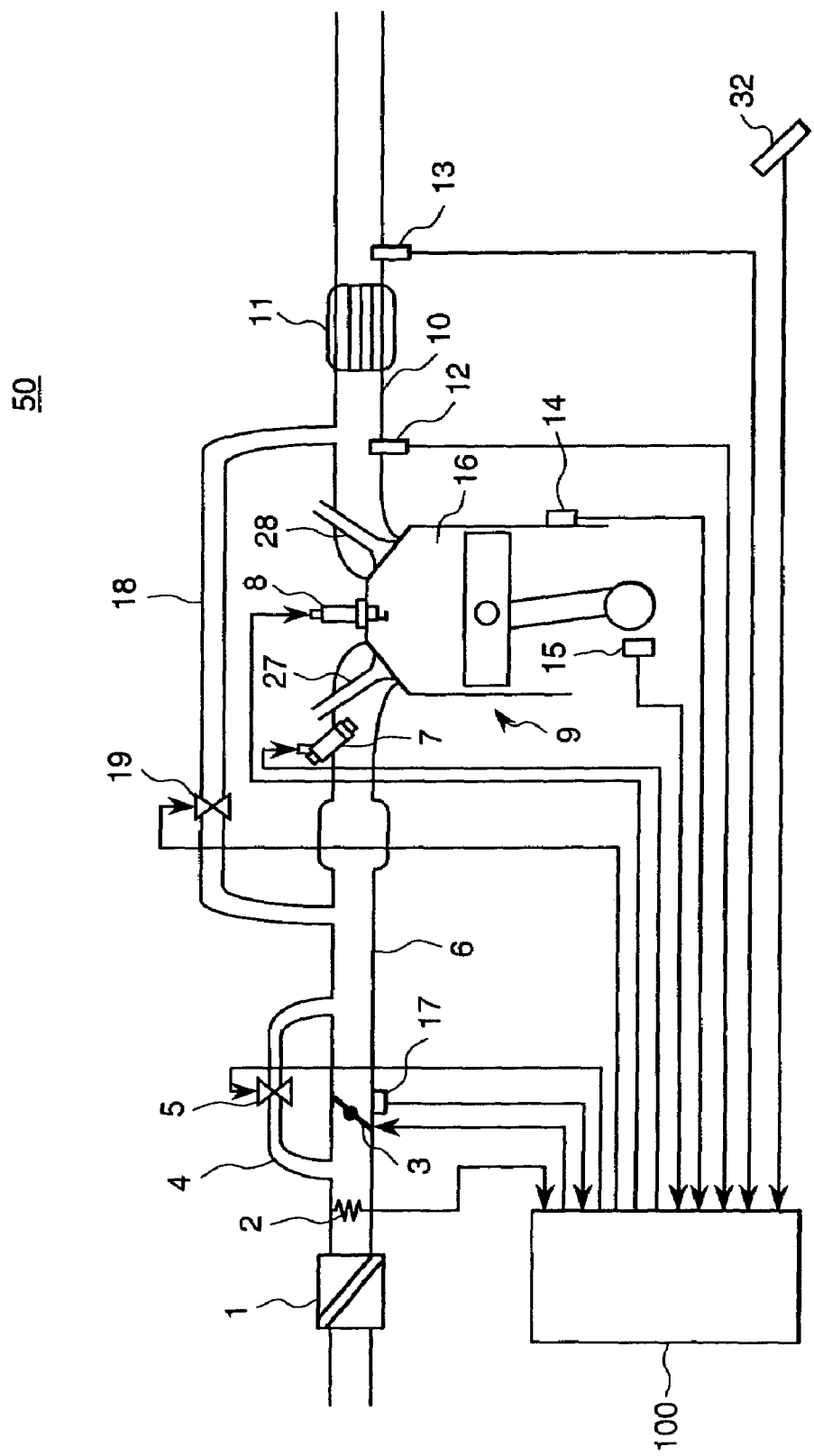
FIG. 1 is a general block diagram of an engine control system provided with an engine control equipment of first embodiment of the present invention.

FIG. 1 shows a general configuration of an engine control system provided with an engine control equipment of the first embodiment of the present invention. An engine 50 is constituted of a multiple cylinder 9 and an intake pipe 6 and an exhaust pipe 10 are connected to each cylinder 9.

An ignition plug 8 is set to each cylinder 9 and a fuel injection valve 7 is set to the intake pipe 6 and moreover, an air cleaner 1, an air-flow sensor 2, an electric-control throttle valve 3, and an ISC bypass 4 for bypassing the throttle valve 3 are set to their proper positions at the upstream side of the intake pipe 6. Moreover, an exhaust-gas circulation path (EGR path) 18 is set which bypasses the cylinder 9 and communicates the intake pipe 6 with the exhaust pipe 10 and an EGR valve 19 is set to the EGR path 18.

Moreover, a three-way catalyst 11 is set to the exhaust pipe 10, an A/F sensor 12 is set to the upstream side of the three-way catalyst 11, and a temperature sensor 13 is set to the downstream side of the three-way catalyst 11. Furthermore, a throttle-opening sensor 17 is set to the portion where the throttle valve 3 is set, a water-temperature sensor 14 is set to the lateral face of the cylinder 9, and a crank-angle sensor 15 is set to the crank shaft portion.

The air coming from the outside of the engine 50 is supplied into a combustion chamber 16 after passing through the air cleaner 1, the intake pipe 6, and an intake valve 27 by lift-timing control electromagnetic driving. The incoming airflow is mainly adjusted by the throttle valve 3. However, the airflow is adjusted by an ISC valve 5 set to the bypass 4 under idling and the engine speed is controlled by the adjustment. Moreover, an incoming airflow is detected by the airflow sensor 2, a signal is output from the crank-angle sensor 15 every degree of rotation angle of the crankshaft and the cooling-water temperature of the engine 50 is detected by the water-temperature sensor 14.

An engine control equipment 100 (control unit) is set to the engine 50, the control unit 100 receives a signal of each of the above sensors and computes the signal and outputs a control signal to each of the above operation units.

That is, signals of the air-flow sensor 2, throttle-opening sensor 17, crank-angle sensor 15, water-temperature sensor 14, A/F sensor 12, and temperature sensor 13, and a signal of an accelerator pedal 32 are sent to the control unit 100, operation states of the engine 50 are obtained from these sensor outputs, and the basic injection quantity of a fuel and the main control input of ignition timing are optimally computed. The fuel injection quantity computed by the control unit 100 is converted to a valve-opening pulse signal and the signal is sent to the fuel injection valve 7.

Moreover, in the control unit 100, a predetermined ignition timing is computed and a driving signal is output to the ignition plug 8 from the control unit 100 so that ignition is performed at the above ignition timing. Furthermore, an internal exhaust-gas recirculation quantity and a fresh-air quantity are controlled by using the intake valve 27 and exhaust valve 28 according to lift-timing-control electromagnetic driving and the pressure and temperature in the combustion chamber 16 are controlled so that self-ignition is performed at a predetermined timing.

The fuel injected from the fuel injection valve 7 is mixed with air supplied from the intake pipe 6 and enters the combustion chamber 16 of each cylinder 9 to form a mixed gas. The mixed gas is ignited and exploded by compressive self-ignition or a spark generated by the spark plug 8 and the energy thus generated serves as a motive-power source for the rotational driving force of the engine 50.

The exhaust gas after explosion in the combustion chamber 16 is supplied to the three-way catalyst 11 through the exhaust valve 28 according to lift-timing-control electromagnetic driving and the exhaust pipe 10. Exhaust-gas components of HC, CO, and NOx are purified by the three-way catalyst 11 and then, the exhaust gas is discharged to the outside of the engine 50. However, some of the exhaust gas is recirculated to the intake pipe 6 through the EGR path 18. Recirculation of the exhaust gas is controlled by the EGR valve 19 in accordance with a signal sent from the control unit 100.

The A/F sensor 12 has a linear output characteristic to the oxygen concentration in exhaust gas and the relation between oxygen concentration in exhaust gas and air-fuel ratio becomes almost linear. Therefore, it is possible to obtain the air-fuel ratio at the upstream side of the three-way catalyst 11 by the A/F sensor 12. Moreover, the temperature sensor 13 makes it possible to detect the exhaust-gas temperature at the downstream side of the three-way catalyst 11.

The control unit 100 calculates the air-fuel ratio at the upstream side of the three-way catalyst 11 in accordance with a signal of the A/F sensor 12 and performs the feedback (F/B) control for sequentially correcting the above basic injection quantity so that the air-fuel ratio of the mixed gas in the combustion chamber 16 becomes equal to a target air-fuel ratio. Moreover, the throttle valve 3, intake valve 27, and exhaust valve 28 are controlled so that they respectively have their target opening, the ignition timing of the spark plug 8 is controlled so as to coincide with a target ignition timing, and activation of the three-way catalyst 11 is accelerated by catalyst control means 150 to be mentioned layer in accordance with a signal of the temperature sensor 13 and the like.

Figure 2:
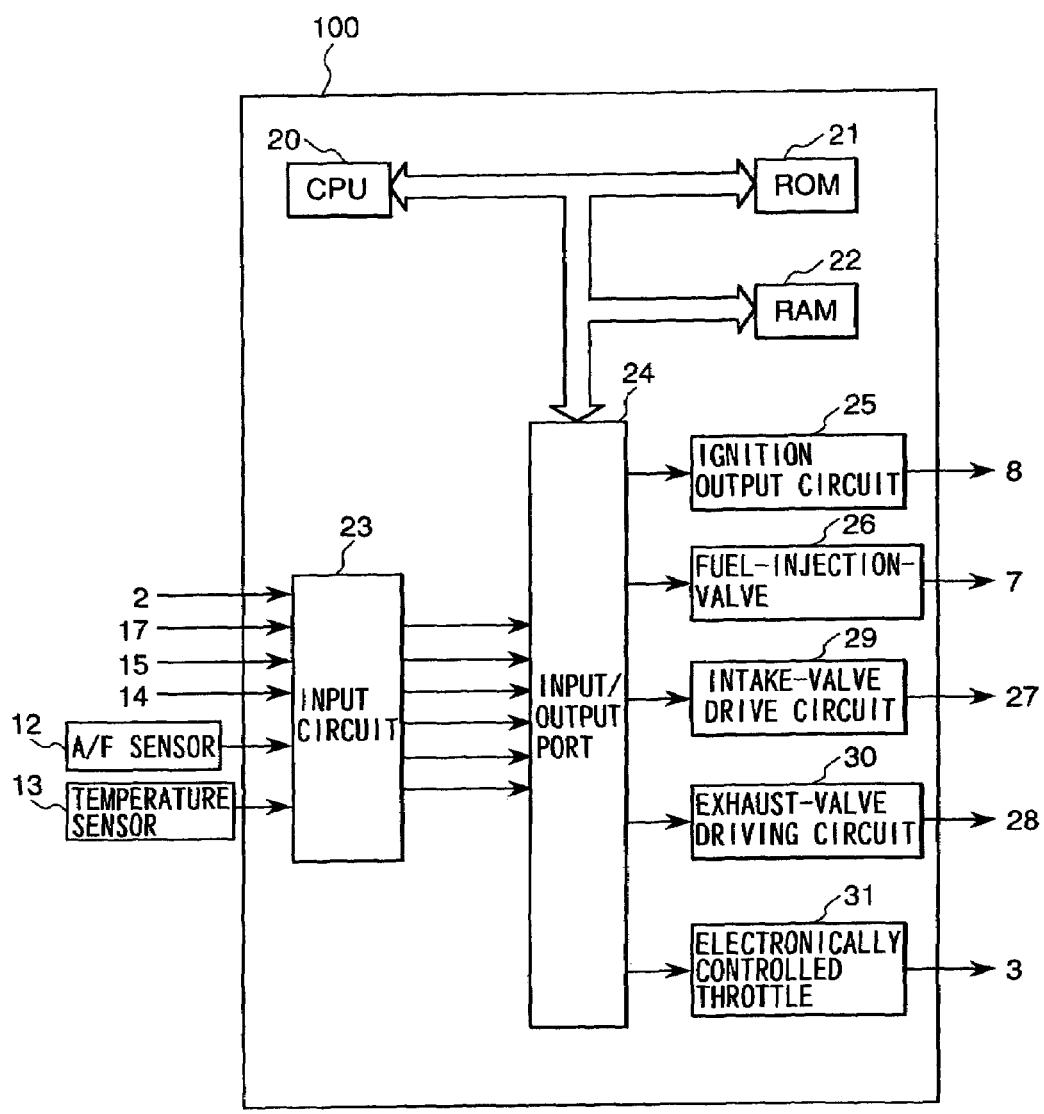
FIG. 2 is an internal block diagram of the engine control equipment in FIG. 1.

FIG. 2 shows the inside of the control unit 100.

Output values of the A/F sensor 12, temperature sensor 13, throttle-opening sensor 17, air-flow sensor 2, crank-angle sensor 15, and water-temperature sensor 14 are input to the control unit 100, signal processing such as noise removal is applied to the output values by an input circuit 23, and then the output values are sent to an input/output port 24. The value of the input/output port 24 is stored in a RAM 22 and computed by a CPU 20. A control program in which the content of arithmetic processing is described is previously written in a ROM 21.

A value showing each actuator working value computed in accordance with the control program is stored in the RAM 22 and then sent to the input/output port 24. Then, as a working signal of the spark plug 8, an on/off signal is set which is turned on when the primary coil of an ignition output circuit 25 is electrified and turned off when the coil is not electrified. The ignition timing is the time when the on/off signal changes from on- to off-states. The signal for the spark plug 8 set to the input/output port 24 is amplified so as to have a sufficient energy necessary for combustion by the ignition output circuit 25 and supplied to the spark plug 8. Moreover, as a driving signal of the fuel injection valve 7, an on/off signal is set which is turned on when a valve opens and turned off when the valve closes, amplified so as to have the energy enough to open the fuel injection valve 7 by a fuel-injection-valve driving circuit 26 and sent to the fuel injection valve 7. Furthermore, driving signals of electromagnetic-driving intake and exhaust valves 27 and 28 are sent to the intake and exhaust valves 27 and 28 through driving circuits 29 and 30 respectively to open/close the valves at optional timing. Furthermore, a driving signal for realizing the target opening of the electric-control throttle valve 3 is sent to the electric-control throttle valve 3 through an electronically controlled throttle driving circuit 31.

Figure 3:
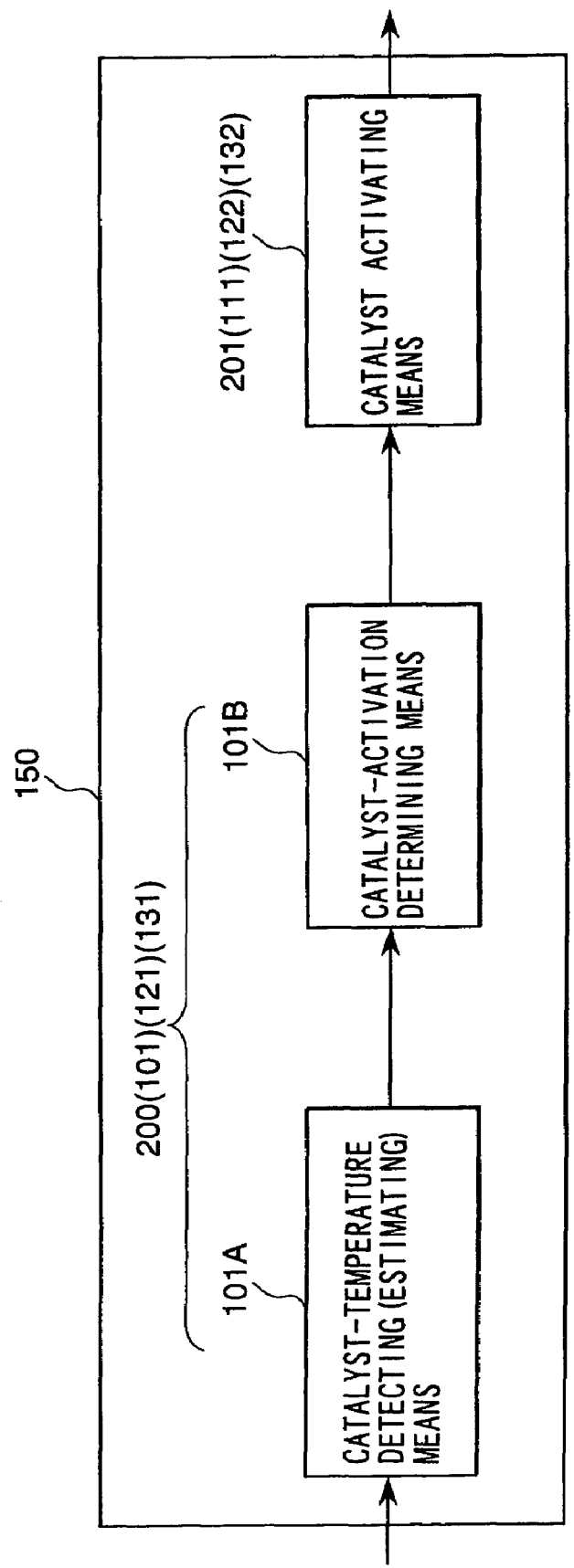
FIG. 3 is a control block diagram of catalyst control means of the engine control equipment in FIG. 1.

Moreover, as shown in FIG. 3, the control unit 100 is provided with control means 150 for the three-way catalyst 11. The catalyst control means 150 is constituted of means 200 for determining the state of the three-way catalyst 11 in accordance with an output signal of the temperature sensor 13 or the like and means 201 for activating the three-way catalyst 11 in accordance with the determination result. The catalyst-state determining means 200 is constituted of catalyst-temperature detecting means 101A for detecting the temperature of the three-way catalyst 11 and catalyst-activation determining means 101B for determining the activation of the three-way catalyst 11 to activate the catalyst 11 in accordance with the activated state of the three-way catalyst 11, achieve early compressive self-ignition, and further prevent exhaust gas from deteriorating.

The control program written in the ROM 21 is described below.

Figure 4:
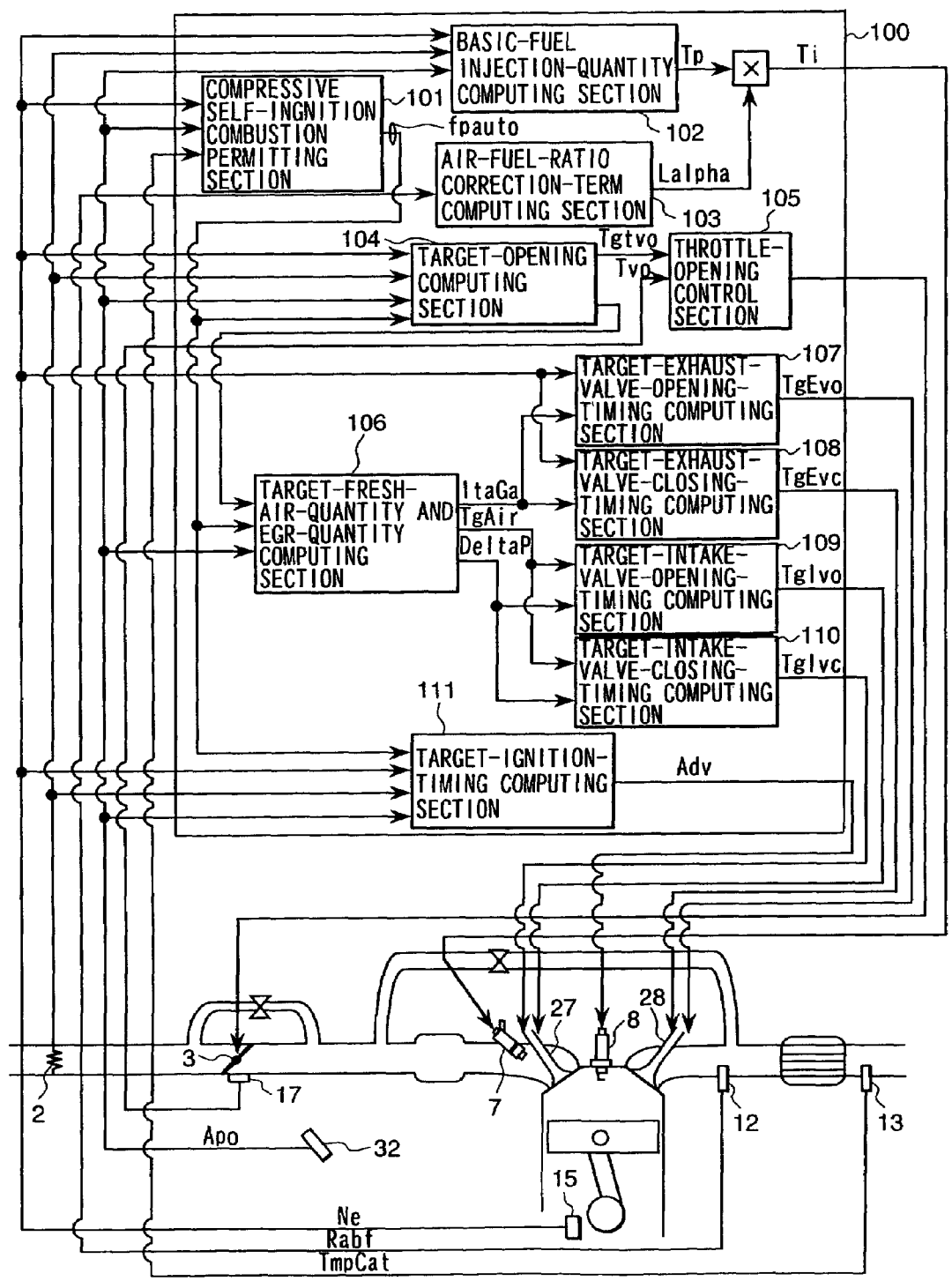
FIG. 4 is a control block diagram of the engine control equipment in FIG. 1.

FIG. 4 shows a control block diagram of the control unit 100. The catalyst control means 150 of the control unit 100 inhibits the combustion by compressive self-ignition and performs combustion by changing the above combustion to the combustion by spark ignition to activate the catalyst 11 by the exhaust heat of the combustion by the spark ignition. Moreover, the control unit 100 is constituted of a compressive-self-ignition-combustion permitting section 101 which is one mode of the catalyst-state determining means 200, a basic-fuel injection-quantity computing section 102, an air-fuel-ratio correction-term computing section 103, a target-opening computing section 104, a throttle-opening control section 105, a target-fresh-air-quantity and EGR-quantity computing section 106, a target-exhaust-valve-opening-timing computing section 107, a target-exhaust-valve-closing-timing computing section 108, a target-intake-valve-opening-timing computing section 109, a target-intake-valve-closing-timing computing section 110, and a target-ignition-timing computing section 111 which is one mode of the catalyst activating means 201. Each control block is described below in detail.

Figure 5:
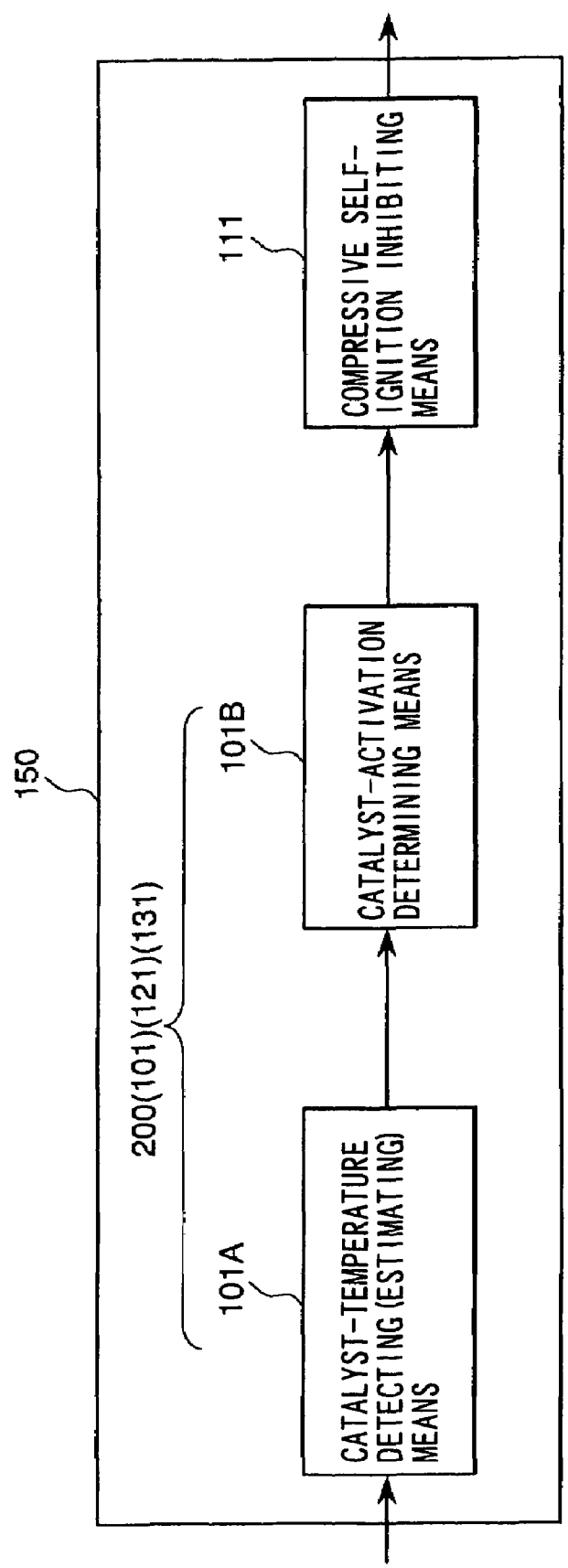
FIG. 5 is a control block diagram of the catalyst control means in FIG. 4.

FIG. 5 is a control block diagram of the catalyst control means 150 in the control unit 100.

The catalyst control means 150 conceptually includes the compressive self-ignition-combustion permitting section 101 and the target-ignition-timing computing section 111 for computing a target ignition timing by performing the spark ignition, which is constituted of the catalyst-temperature detecting means 101A and catalyst-activation determining means 101B, detects the temperature of the three-way catalyst 11 by the catalyst-temperature detecting means 101A, determines the activation of the three-way catalyst 11 by the catalyst-temperature detecting means 101B, and outputs a signal for executing the combustion not by compressive self-ignition but by spark ignition by the compressive-self-ignition inhibiting means 111 to the target-opening computing section 104, target-fresh-air-quantity and EGR-quantity computing section 106, and target-ignition-timing computing section 111.

Figure 6:
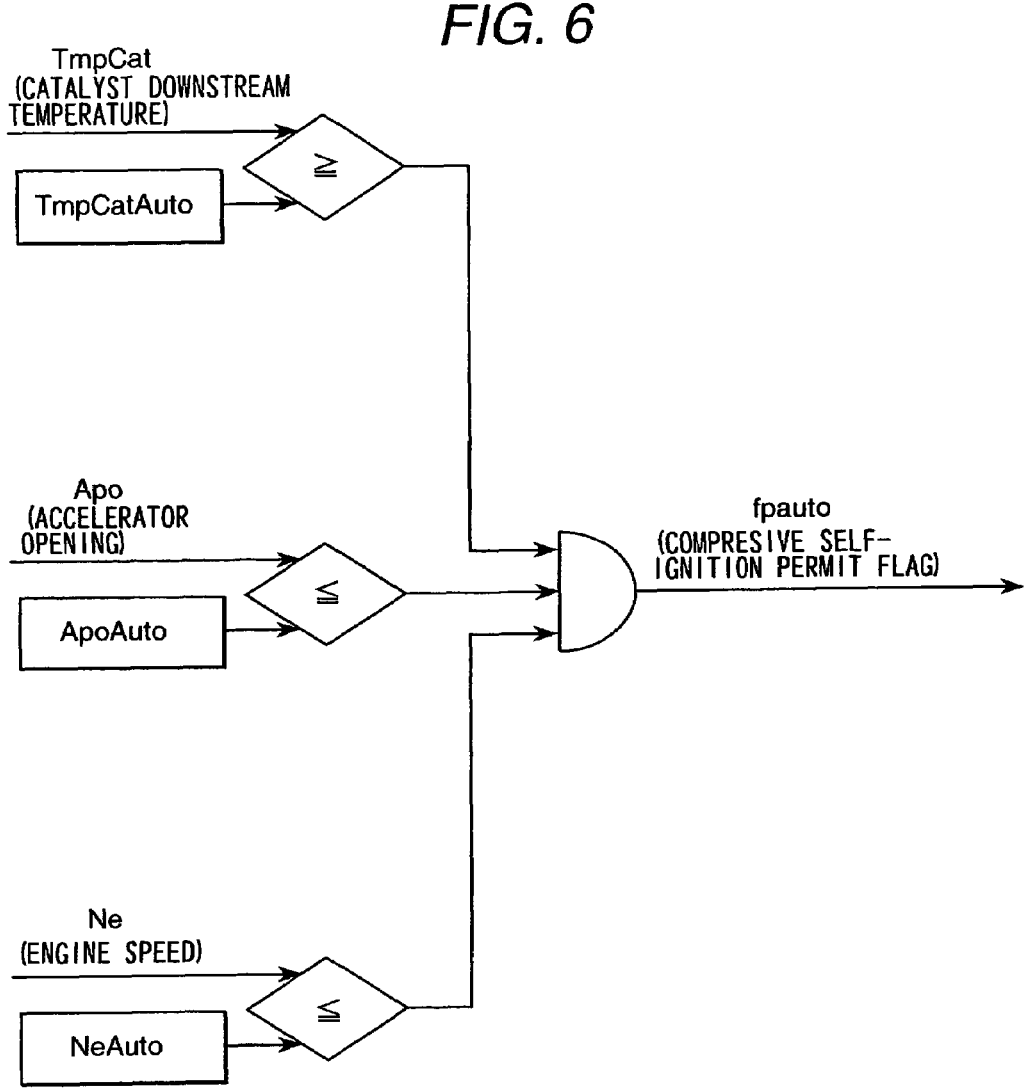
FIG. 6 is an illustration of the compressive-self-ignition-combustion permitting section in FIG. 4.

FIG. 6 is an illustration for permission of the compressive self-ignition by the compressive-self-ignition-combustion permitting section 101, in which the compressive-self-combustion permitting section 101 determines whether to permit compressive self-ignition in accordance with a downstream temperature Cat of the catalyst 11, an accelerator opening Apo, and an engine speed Ne. Specifically, when all of the following conditions (1) to (3) are effectuated, the section 101 sets a compressive-self-ignition permit flag fpauto to 1 to perform compressive-self-ignition combustion. However, when not all of the conditions (1) to (3) are effectuated, the section 101 inhibits compressive self-ignition and sets the compressive-self-ignition permit flag fpauto to 0 to change the compressive self-ignition to spark ignition.

$$TmpCat \geq TmpCatAuto \quad (1)$$

$$Apo \leq ApoAuto \quad (2)$$

$$Ne \leq NeAuto \quad (3)$$

In the above expressions, TmpCatAuto denotes a set value of downstream temperature, ApoAuto denotes a set value of accelerator opening, and NeAuto denotes a set value of engine speed which are stored in the ROM 21. Then, the expression (1) shows the activated state of a catalyst, in which a catalyst becomes the inactivated state when the catalyst temperature TmpCat is lower than TmpCatAuto.

Figure 7:
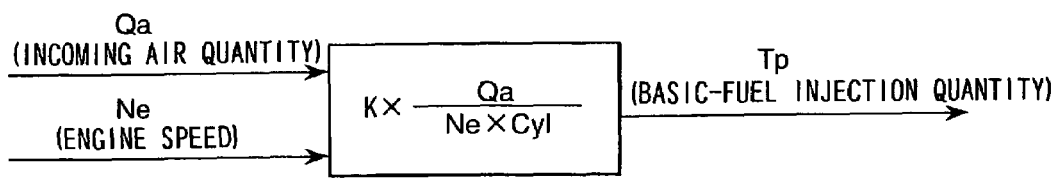
FIG. 7 is an illustration of the basic-fuel-injection-quantity computing section in FIG. 4.

FIG. 7 is an illustration of the calculation of a basic fuel-injection quantity by the basic-fuel-injection-quantity computing section 102. The basic-fuel-injection-quantity computing section 102 computes a fuel injection quantity for simultaneously realizing a target torque and a target air-fuel ratio under an optional condition in accordance with signals of an incoming air quantity Qa by the air-flow sensor 2, an engine speed Ne, and an accelerator pedal 32. Specifically, the section 102 computes a basic fuel-injection quantity Tp as shown by the following expression (4).

$$Tp = K \times Qa/(Ne \times Cyl) \quad (4)$$

In the above expression, k denotes a constant value for adjusting the incoming air quantity Qa so as to always realize a theoretical air-fuel ratio and Cyl denotes the number of cylinders 9.

Figure 8:
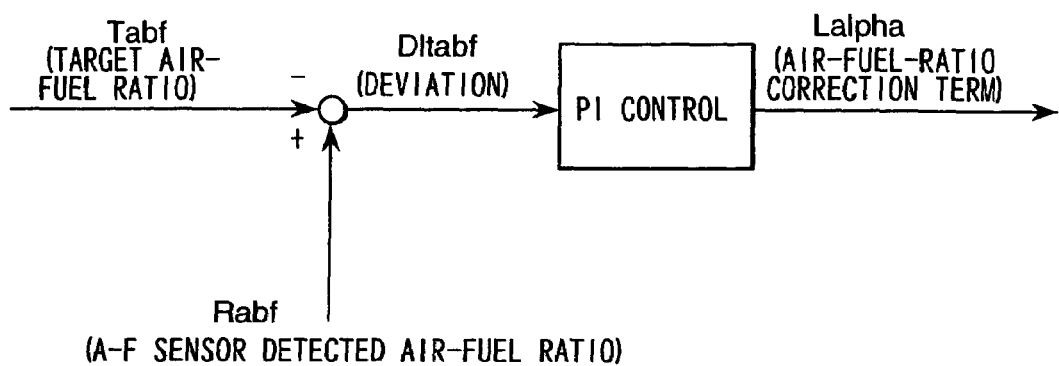
FIG. 8 is an illustration of the air-fuel-correction-term computing section in FIG. 4.

FIG. 8 is an illustration of the calculation of an air-fuel-ratio correction term by the air-fuel ratio-correction-term computing section 103. The air-fuel-ratio correction-term computing section 103 performs F/B control so that an air-fuel ratio becomes equal to a theoretical air-fuel ratio under an optional operating condition in accordance with the deviation Dltabf between an actual air-fuel ratio Rabf detected by the A/F sensor 12 and a target air-fuel ratio Tabf. Specifically, an air-fuel-ratio correction term Lalpha is computed through PI control. Then, the air-fuel-ratio correction term Lalpha is multiplied by the basic-fuel-injection quantity Tp, held so that the air-fuel ratio of an engine always becomes equal to a theoretical air-fuel ratio, and output to the fuel injection valve 7.

In general, to cause compressive self-ignition, it is necessary to control the pressure and temperature in the cylinder 9 to predetermined values at a predetermined crank angle and simultaneously realize a torque intended by a driver. Therefore, this embodiment controls fresh-air quantity and internal EGR quantity by using the electric-control throttle valve 3, electromagnetic-driving-type intake valve 27, and electromagnetic-driving-type exhaust valve 28 and performs the following coordination control so that the pressure and temperature in the cylinder 9 become predetermined high values.

First, because a combustion air-fuel ratio is made equal to a theoretical air-fuel ratio, the above fresh-air quantity and torque are proportional to each other, that is, it is possible to control the torque by the fresh-air quantity. Therefore, the fresh-air quantity is controlled by the electric-control throttle valve 3 and electromagnetic-driving-type intake valve 27 and the pressure and temperature in the cylinder 9 are controlled by the remaining gas in the cylinder 9, that is, the internal EGR quantity is controlled by the electromagnetic-driving-type exhaust valve 28.

Moreover, because compressive-self-ignition combustion is different from spark-ignition combustion in requested EGR quantity, a target internal EGR quantity is changed by the value of the compressive-self-ignition permit flag fpauto and thereby, the opening/closing timing of the intake valve 27 for taking a requested fresh-air quantity into the cylinder 9 in accordance with an internal EGR quantity is changed.

That is, a fresh-air quantity and an internal EGR quantityare controlled so that the following expressions (5) and (6) are effectuated under an optional operating condition.

$$\eta a, a = \eta a, s \ (ma, a = ma, s) \quad (5)$$

$$\eta e, a = \eta e, s \ (me, a = me, s) \quad (6)$$

In the above expressions, $\eta a,a$ denotes the filling efficiency of fresh-air quantity under compressive-self-ignition combustion, $\eta a,s$ denotes the filling efficiency of fresh-air quantity under spark-ignition combustion, $\eta e,a$ denotes the filling efficiency of internal EGR quantity under compressive-self-ignition combustion, $ma,a$ denotes fresh-air quantity under compressive-self-ignition combustion, $ma,s$ denotes a fresh-air mass under spark-ignition combustion, $me,a$ denotes an internal EGR mass under compressive-self-ignition combustion, and $me,s$ denotes internal EGR mass under spark-ignition combustion.

Moreover, in general, because internal EGR quantity requested for compressive self-ignition is more than that under spark-ignition combustion, the following expressions (7) to (9) are effectuated.

$$\eta g, a > \eta g, s \ (mg, a > mg, s) \quad (7)$$

$$mg, a = ma, a + me, a \quad (8)$$

$$mg, s = ma, s + me, s \quad (9)$$

In the above expressions, $\eta g,a$ denotes the gas filling efficiency in the cylinder 9 under compressive-self-ignition combustion, $\eta g,s$ denotes the gas filling efficiency in the cylinder 9 under spark-ignition combustion, $mg,a$ denotes the gas mass in the cylinder 9 under compressive-self-ignition combustion, and $mg,s$ denotes the gas mass in the cylinder 9 under spark-ignition combustion. Moreover, the control unit 100 of this embodiment first decides a target internal EGR quantity and then, decides a fresh-air quantity for realizing a target torque.

Figure 9:
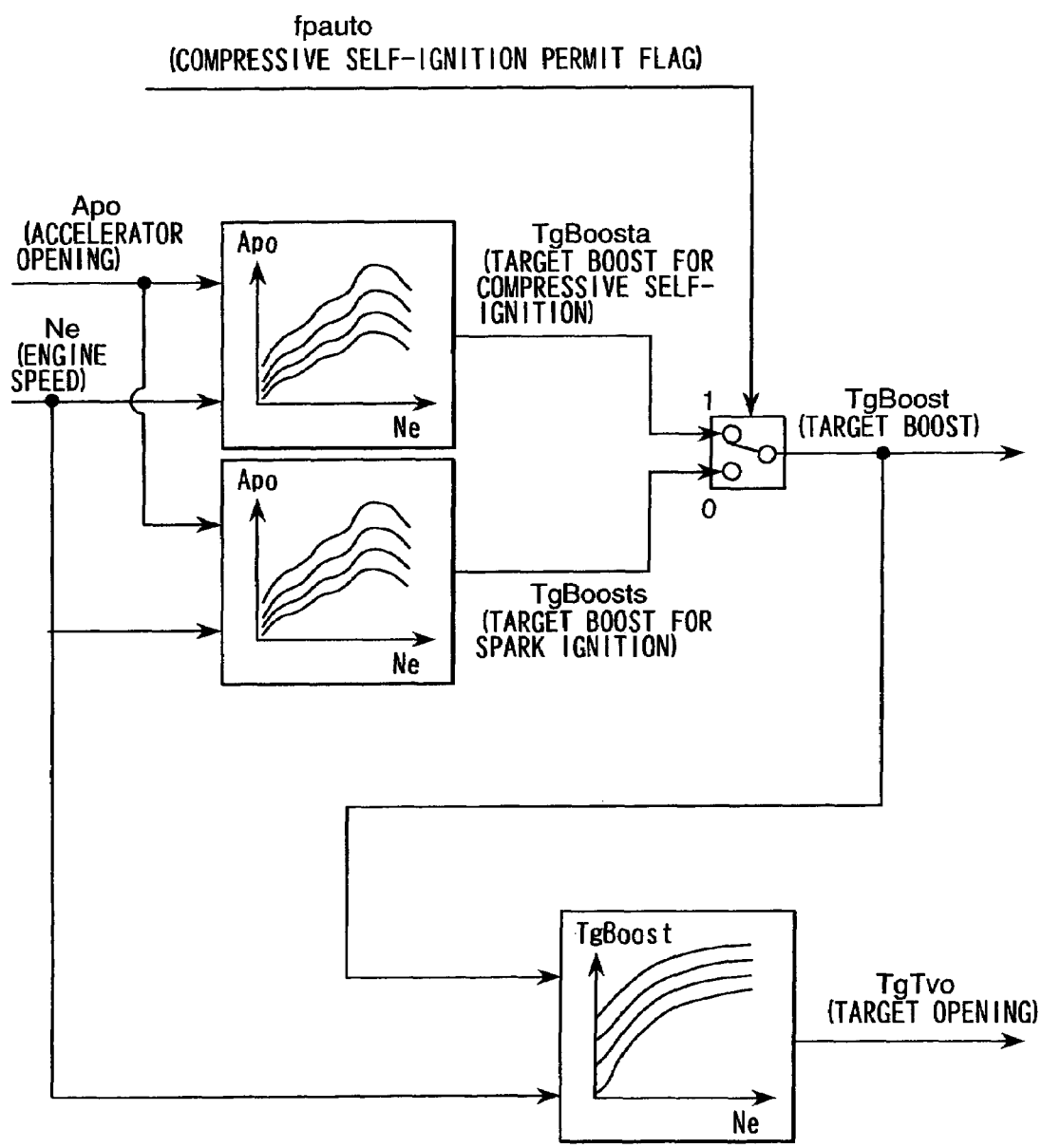
FIG. 9 is an illustration of the target-opening computing section in FIG. 4.

FIG. 9 is an illustration for calculation of a target opening of the electric-control throttle valve 3 by the target-opening computing section 104. The target-opening computing section 104 computes a throttle opening for realizing a target boost under an optional operating condition in accordance with signals of the air-flow sensor 2, crank-angle sensor 15, and accelerator pedal 32 and the compressive-self-ignition permit flag fpauto. Specifically, a target boost TgBoosta for compressive self-ignition or a target boost TgBoosts for spark ignition is decided in accordance with the accelerator opening Apo and engine speed Ne by referring to a map, a target boost TgBoost is set by changing the boost TgBoosta or TgBoosts by the compressive-self-ignition permit flag fpauto, a target opening TgTvo is decided in accordance with the target boost TgBoost and engine speed Ne by referring to a map, and they are output to the throttle-opening control section 105, target-fresh-air-quantity and EGR-quantity computing section 106.

Figure 10:
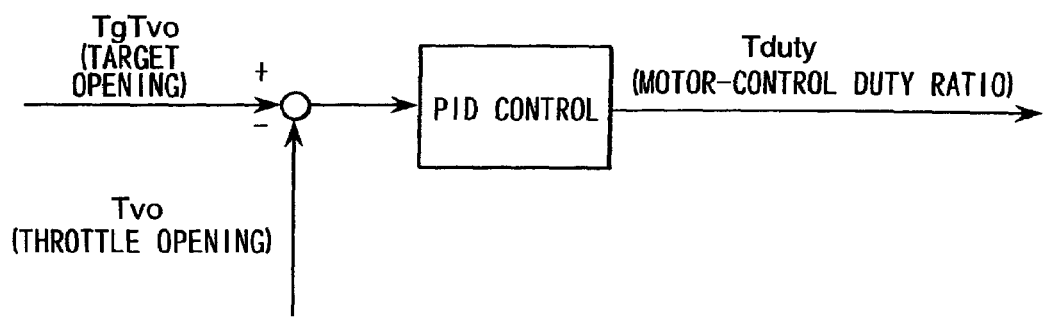
FIG. 10 is an illustration of the throttle-opening control section in FIG. 4.

FIG. 10 is an illustration of the throttle-opening control section 105. The throttle-opening control section 105 performs F/B control in accordance with the actual throttle opening Tvo by the throttle-opening sensor 17 so that the opening of the electric-control throttle valve 3 becomes equal to the target opening TgTvo and the control result is output to the electric-control throttle valve 3. Though the control algorithm of this embodiment uses PI control, other position-control algorithm can be also used.

Figure 11:
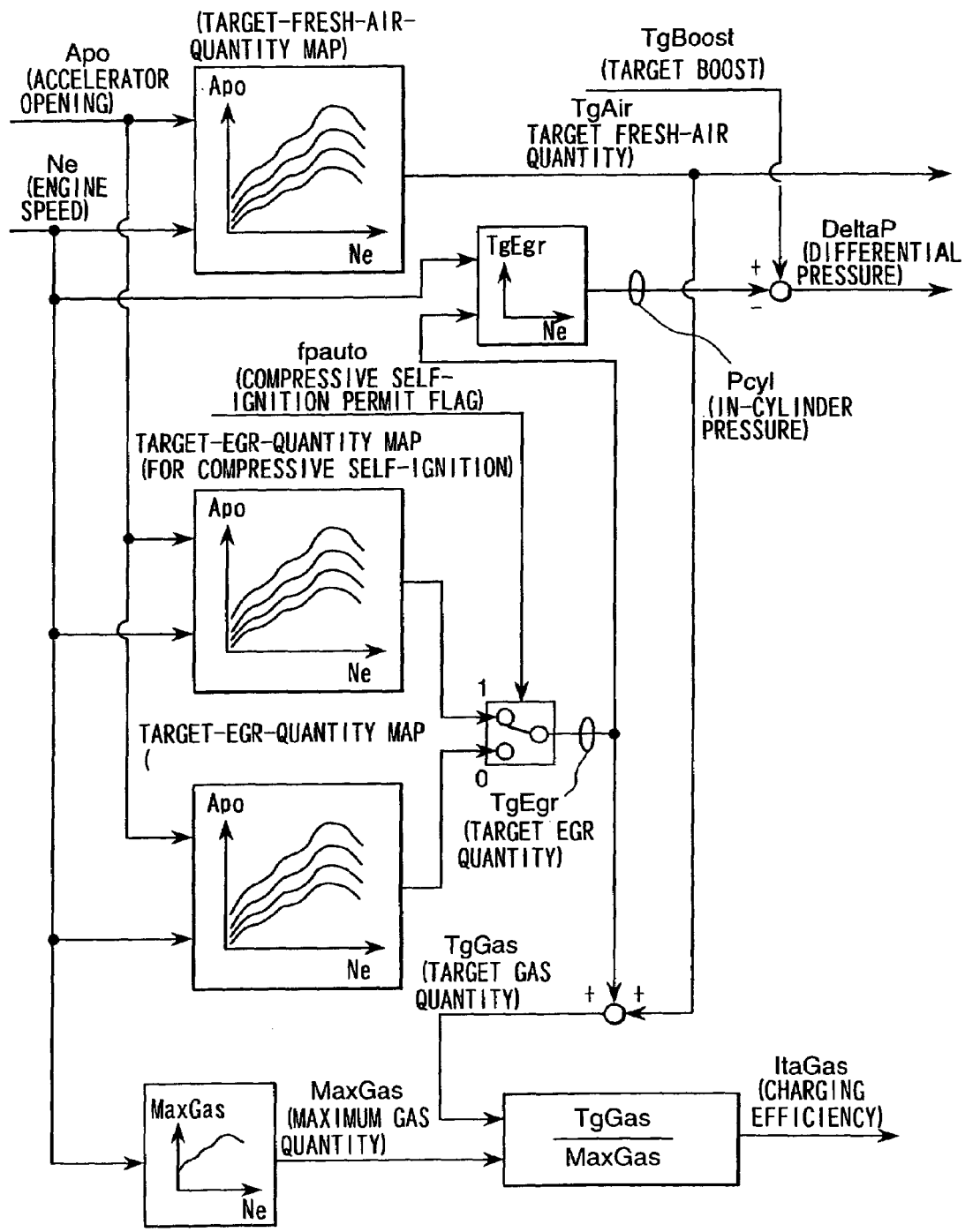
FIG. 11 is an illustration of the target-fresh-air-quantity and EGR-quantity computing section in FIG. 4.

FIG. 11 is an illustration for calculation of a target fresh-air quantity and a filling rate by the target-fresh-air-quantity and EGR-quantity computing section 106. The target-fresh-air-quantity and EGR-quantity computing section 106 computes a target fresh-air quantity and a target EGR quantity for realizing a target torque, a target in-cylinder-9 temperature, and a target in-cylinder-9 pressure under an optional condition in accordance with the accelerator pedal 32, target boost TgBoost, and compressive-self-ignition permit flag fpauto. Specifically, a target fresh-air quantity TgAir is decided in accordance with the accelerator opening Aoi and engine speed Ne by referring to a map and output to the target-intake-valve-opening-timing computing section 109 and target-intake-valve-closing-timing computing section 110.

Moreover, a target EGR quantity under compressive self-ignition or a target EGR quantity under spark ignition is decided in accordance with the accelerator opening Apo and engine speed Ne by referring to a map and changed by the value of the compressive-self-ignition permit flag fpauto to set a target EGR quantity TgEgr. Moreover, the differential pressure DeltaP between an in-intake-valve-6 pressure and an in-cylinder-9 pressure is decided in accordance with the target EGR quantity TgEgr and engine speed Ne by referring to a map and output to the target-intake-valve-opening-timing computing section 109 and target-intake-valve-closing-timing computing section 110. The above target EGR quantity is changed in accordance with the value of the compressive-self-ignition permit flag fpauto because requested EGR quantities are different from each other under compressive-self-ignition combustion and spark-ignition combustion.

Furthermore, a target gas quantity TgGas is obtained in accordance with the target EGR quantity TgEgr and target fresh-air quantity TgAir, a filling efficiency ItaGas is decided in accordance with the maximum gas quantity MaxGas and a target gas quantity TgGas obtained from the engine speed Ne and output to the target-exhaust-valve-opening-timing computing section 107 and target-exhaust-valve-closing-timing computing section 108.

Figure 12:
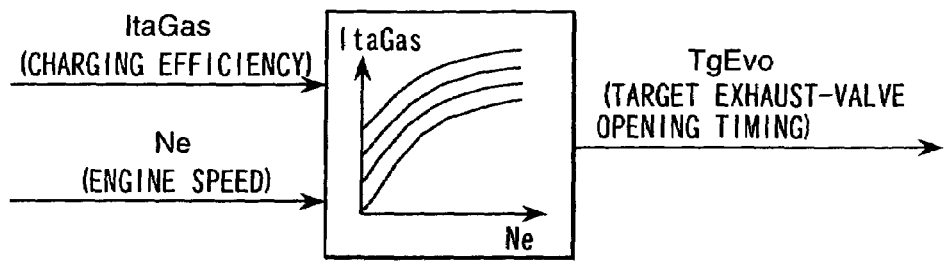
FIG. 12 is an illustration of the target-exhaust-valve-opening-timing computing section in FIG. 4.

FIG. 12 is an illustration for calculation of an opening timing by the target-exhaust-valve-opening-timing computing section 107. The target-exhaust-valve-opening-timing computing section 107 computes the opening timing of an exhaust valve for realizing the target EGR quantity TgEgr in accordance with the filling efficiency ItaGas and engine speed Ne. Specifically, a target-exhaust-valve opening timing TgEvo is decided in accordance with the filling efficiency ItaGas and engine speed Ne by referring to a map and output to the electromagnetic-driving-type exhaust valve 28.

Figure 13:
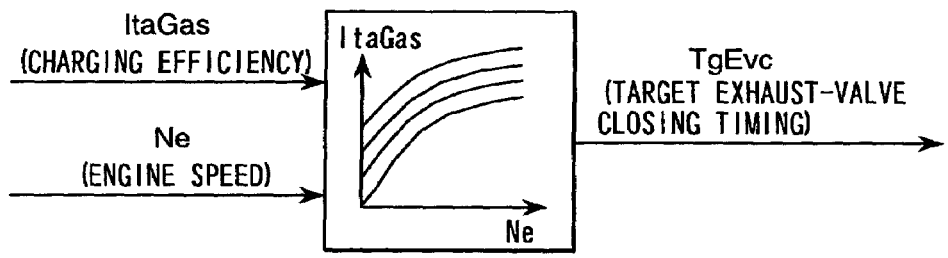
FIG. 13 is an illustration of the target-exhaust-valve-closing-timing computing section in FIG. 4.

FIG. 13 is an illustration for calculation of a closing timing by the target-exhaust-vale-closing-timing computing section 108. The target-exhaust-vale-closing-timing computing section 108 computes the closing timing of an exhaust valve for realizing the target EGR quantity TgEgr in accordance with the filling efficiency ItaGas and engine speed Ne. Specifically, a target exhaust-valve closing timing TgEvc is decided in accordance with the filling efficiency ItaGas and engine speed Ne by referring to a map and output to the electromagnetic-driving-type exhaust valve 28.

Figure 14:
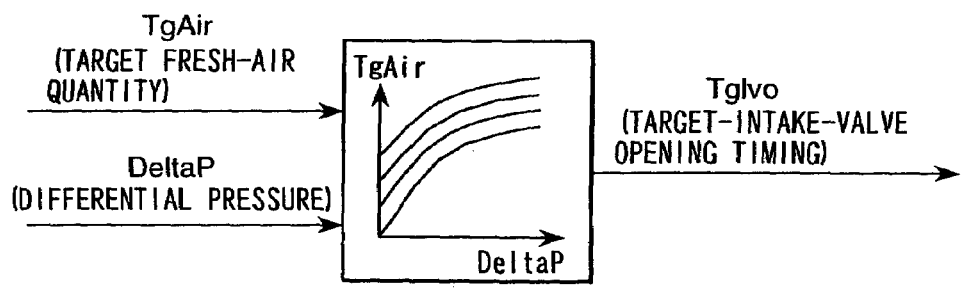
FIG. 14 is an illustration of the target-intake-valve-opening-timing computing section in FIG. 4.

FIG. 14 is an illustration for calculation of an opening timing by the target-intake-valve-opening-timing computing section 109. The target-intake-valve-opening-timing computing section 109 computes the opening timing of an intake valve for realizing the target fresh-air quantity TgAir in accordance with the target fresh-air quantity TgAir and differential pressure DeltaP. Specifically, a target-intake-valve opening timing TgIvo is decided in accordance with the target fresh-air quantity TgAir and differential pressure DeltaP by referring to a map and output to the electromagnetic-driving-type intake valve 27.

Figure 15:
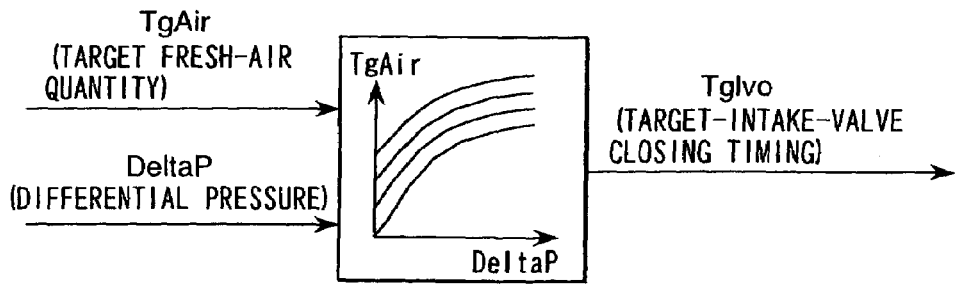
FIG. 15 is an illustration of the target-intake-valve-closing-timing computing section in FIG. 4.

FIG. 15 is an illustration for calculation of a closing timing by the target-intake-valve-closing-timing computing section 110. The target-intake-valve-closing-timing computing section 110 computes the closing timing of an intake valve for realizing the target fresh-air quantity TgAir in accordance with the target fresh-air quantity TgAir and differential pressure DeltaP. Specifically, a target-intake-valve closing timing TgIvc is decided in accordance with the target fresh-air quantity TgAir and differential pressure DeltaP by referring to a map and output to the electromagnetic-driving-type intake valve 27.

Figure 16:
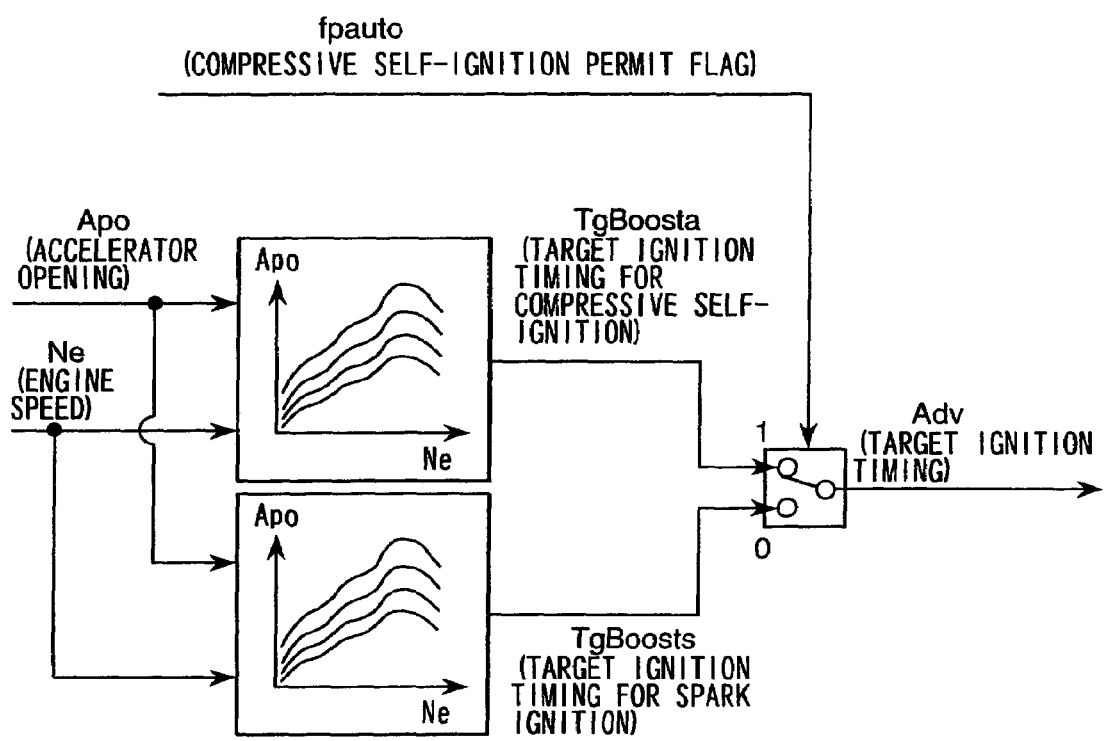
FIG. 16 is an illustration of the target-ignition-timing computing section in FIG. 4.

FIG. 16 is an illustration for calculation of a target ignition timing by the target-ignition-timing computing section 111. The target-ignition-timing computing section 111 computes an optimum ignition timing under an optional operating condition in accordance with signals of the air-flow sensor 2, crank-angle sensor 15, and accelerator pedal 32 and the compressive-self-ignition permit flag fpauto. Specifically, the target boost TgBoosta under compressive self-ignition or TgBoosts under spark ignition is decided in accordance with the accelerator opening Apo and engine speed Ne by referring to a map and changed by the compressive-self-ignition permit flag fpauto to set a target ignition timing Adv and the timing Adv is output to the spark plug 8. Moreover, ignition can be performed preparing for a misfire even under compressive self-ignition combustion. In this case, a target ignition timing is selected at more retard side than a self-ignition timing.

FIGS. 17 to 25 show an engine control equipment of second embodiment which is the same as the engine control equipment of the first embodiment except the configuration based on the catalyst control means 150. Therefore, the above point is described below in detail.

Figure 17:
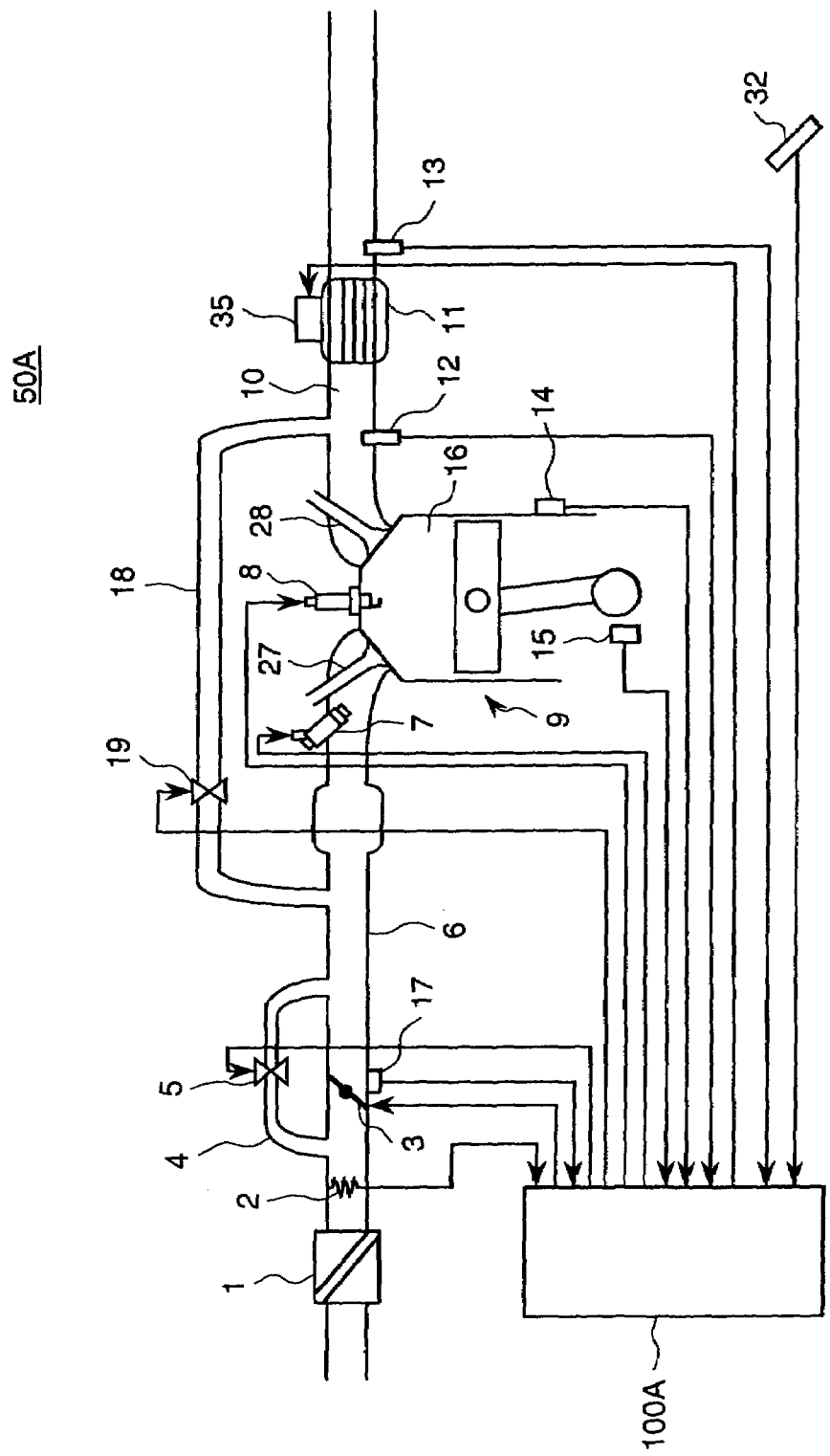
FIG. 17 is a general block diagram of an engine control system provided with an engine control equipment of second embodiment of the present invention.
Figure 18:
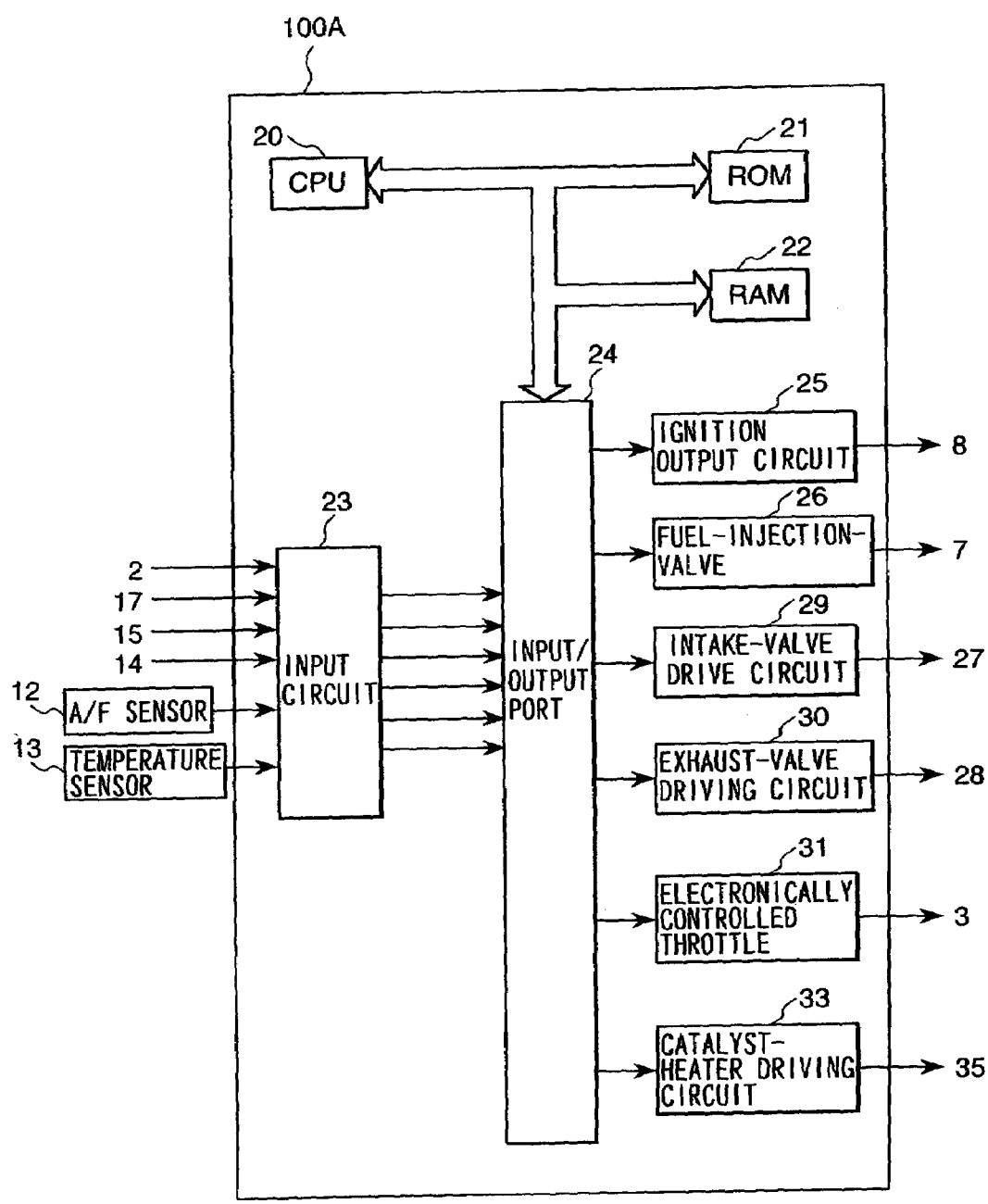
FIG. 18 is an internal block diagram of the engine control equipment in FIG. 17.

FIG. 17 shows the general configuration of an engine control system provided with the engine control equipment of the second embodiment of the present invention, in which a three-way catalyst 11 is set to an exhaust pipe 10 of an engine 50A, an A/F sensor 12 is set to the upstream side of the three-way catalyst 11, and a temperature sensor 13 is set to the downstream side of the three-way catalyst 11. Moreover, a catalyst heater 35 is set to a proper position of the three-way catalyst 11. The catalyst heater 35 is operated in accordance with an output signal of an engine control equipment (control unit) 100A when the temperature of the catalyst 11 is equal to or lower than a predetermined value to activate the catalyst. In FIG. 18, a catalyst-heater driving circuit 33 is provided as shown by an internal block diagram of the control unit 100A.

Figure 19:
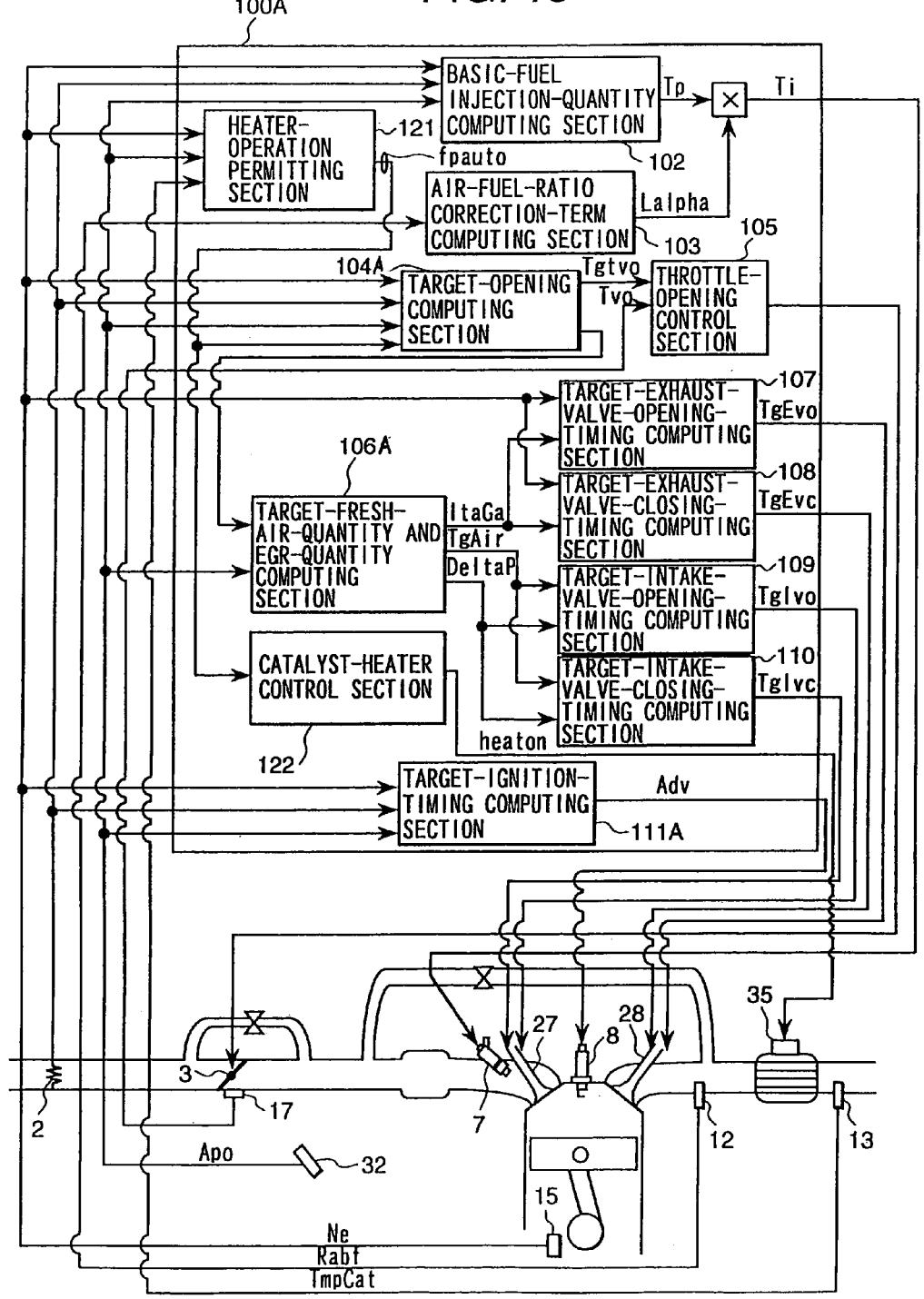
FIG. 19 is a control block diagram of the engine control equipment in FIG. 17.

FIG. 19 shows a control block diagram of the control unit 100A in which the catalyst control means 150 drives the catalyst heater 35 when the temperature of the catalyst 11 is equal to or lower than a predetermined value to activate the catalyst 11 by the heat of the heater 35. Moreover, the control unit 100A is constituted of a heater-operation permitting section 121 which is one mode of the catalyst-state determining means 200, a basic-fuel-injection-quantity computing section 102, an air-fuel-ratio-correction-term computing section 103, a target-opening computing section 104A, a throttle-opening control section 105, a target-fresh-air-quantity and EGR-quantity computing section 106A, a target-exhaust-valve-opening-timing computing section 107, a target-exhaust-valve-closing-timing computing section 108, a target-intake-valve-opening-timing computing section 109, a target-intake-valve-closing-timing computing section 110, a target-ignition-timing computing section 111A, and a catalyst-heater control section 122 which is one mode of the catalyst activating means 201. Each control block is described below in detail.

Figure 20:
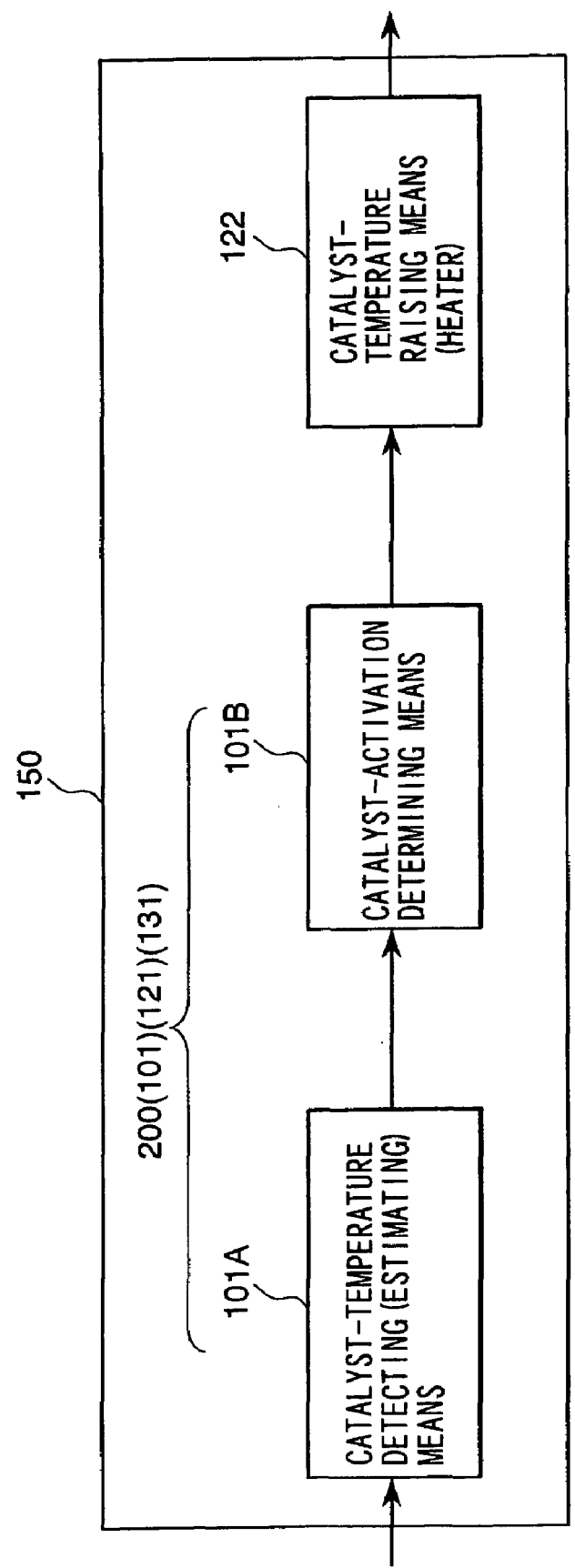
FIG. 20 is a control block diagram of the catalyst control means in FIG. 19.

FIG. 20 is a control block diagram of the catalyst control means 150 in the control unit 100A.

The catalyst control means 150 conceptually includes the heater-operation permitting section 121 and the catalyst-temperature raising means 122 for driving-controlling the catalyst heater 35, which is constituted of the catalyst-temperature detecting means 101A and catalyst-activation determining means 101B and which detects the temperature of the three-way catalyst 11 by the catalyst-temperature detecting means 101A in accordance with an output signal of the temperature sensor 13, determines the activation of the three-way catalyst 11 by the catalyst-activation determining means 101B in accordance with the detected temperature, and outputs a signal for executing heater operations to the catalyst-heater control section 122 in accordance with the above determination result.

Figure 21:
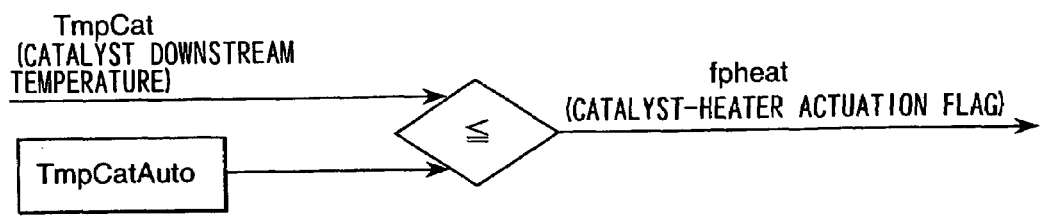
FIG. 21 is an illustration of the heater-operation permitting section in FIG. 19.

FIG. 21 is an illustration for permission of a heater operation by the heater-operation permitting section 121, in which the heater-operation permitting section 121 determines permission of compressive self-ignition in accordance with the downstream temperature TmCat of the catalyst 11. Specifically, when the following expression (10) is effectuated, the section 121 sets a catalyst-heater-operation flag fpheat to 1 to perform heater operations. However, when the expression (10) is not effectuated, the section 121 stops heater operations and sets the catalyst-heater-operation flag fpheat to 0.

$$TmpCat \geq TmCatAuto \qquad (10)$$

In this case, the expression (10) shows a catalyst activation state and a catalyst becomes an inactive state when the catalyst temperature TmpCat is lower than TmpCatAuto.

The basic-fuel-injection-quantity computing section 102 and air-fuel-correction-term computing section 103 are the same as those of the first embodiment.

Figure 22:
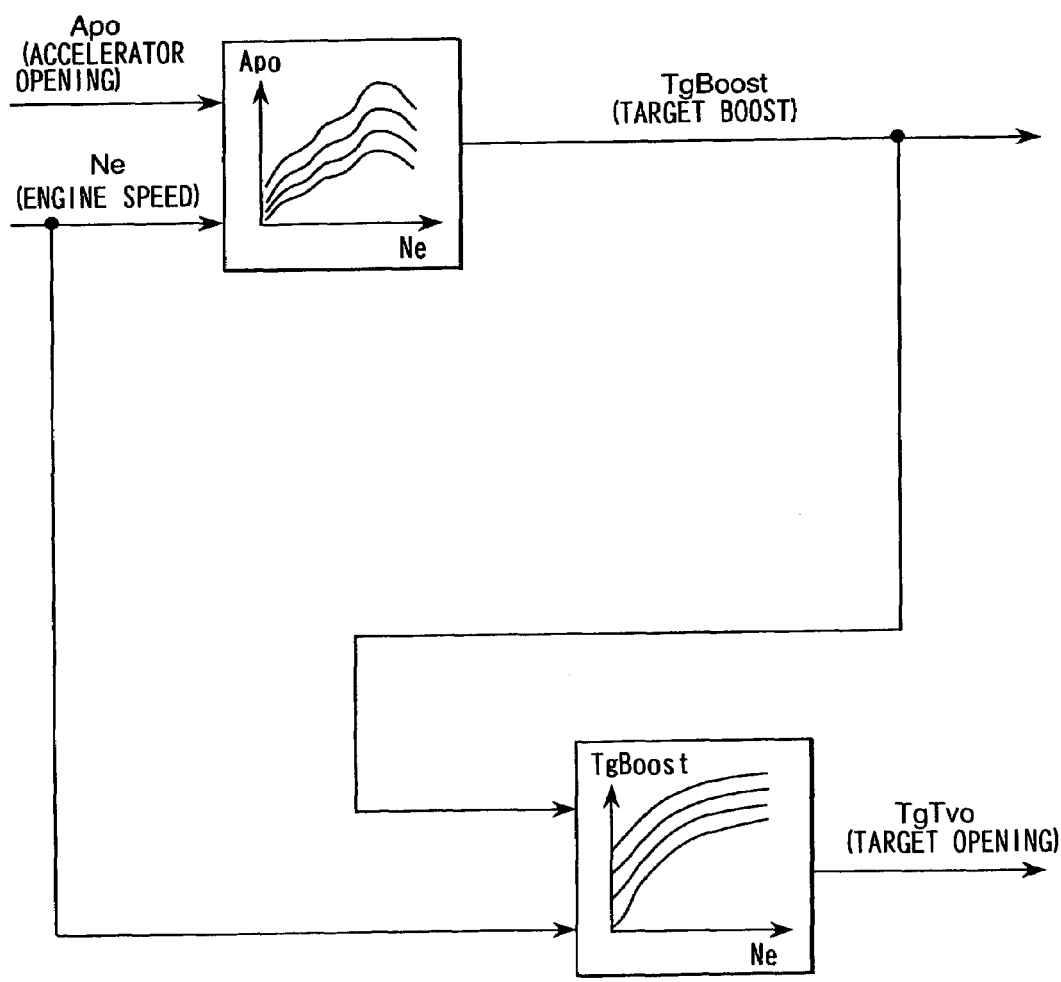
FIG. 22 is an illustration of the target-opening computing section in FIG. 19.

FIG. 22 is an illustration for calculation of a target opening of the electric-control throttle valve 3 by the target-opening computing section 104A. The target-opening computing section 104A computes a throttle opening for realizing a target boost under an optional operating condition in accordance with signals of the air-flow sensor 2, crank-angle sensor 15, and accelerator pedal 32. Specifically, the target boost TgBoost is set in accordance with the accelerator opening Apo and engine speed Ne by referring to a map, and the target opening TgTvo is decided in accordance with the target boost TgBoost and engine speed Ne by referring to a map and they are output to the throttle-opening control section 105 and target-fresh-air-quantity and EGR-quantity computing section 106A.

The throttle-opening control section 105 is the same as that of the first embodiment.

Figure 23:
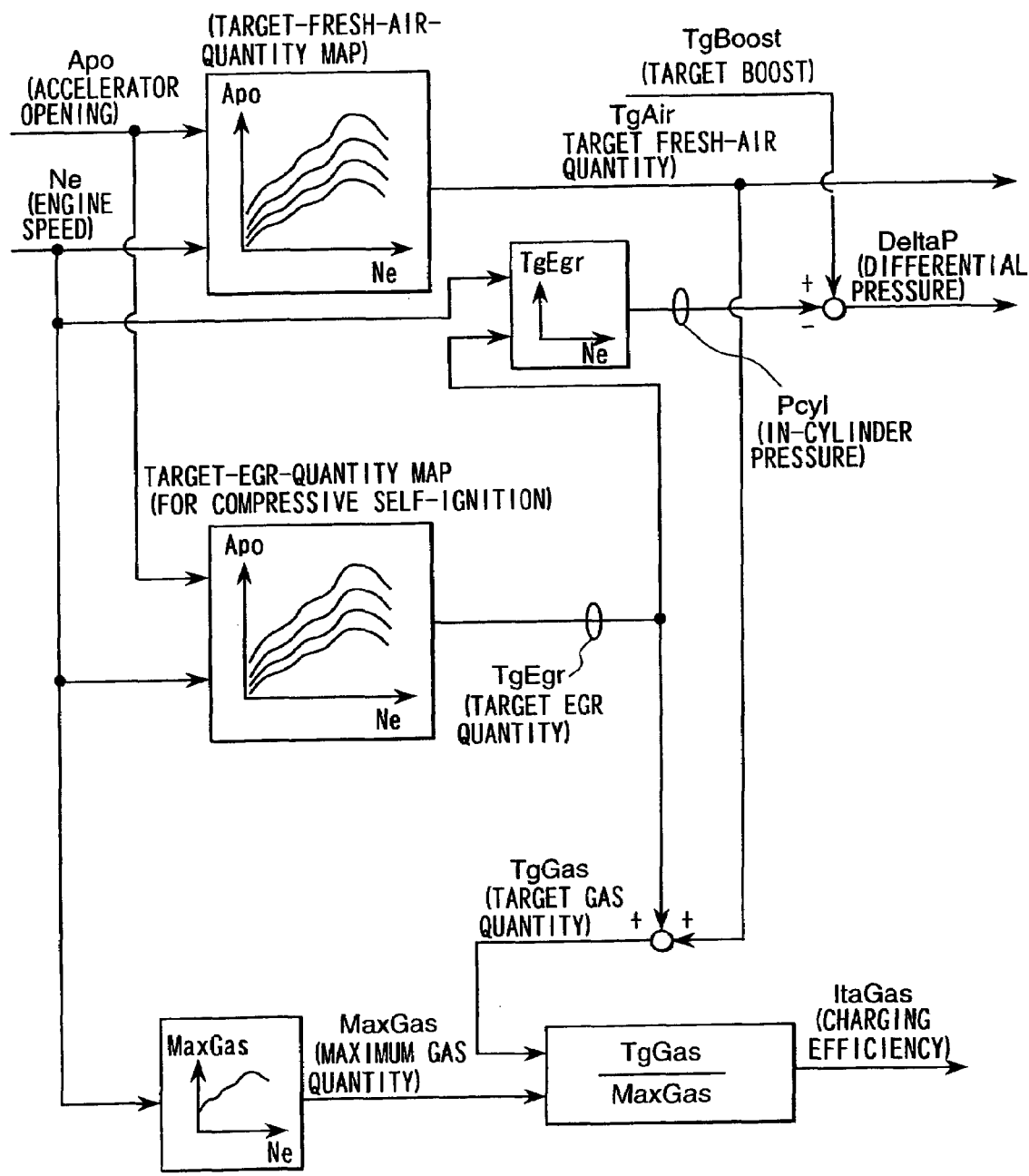
FIG. 23 is an illustration of the target-fresh-air-quantity and EGR-quantity computing section in FIG. 19.

FIG. 23 is an illustration for calculation of target fresh-air quantity and filling efficiency by the target-fresh-air-quantity and EGR-quantity computing section 106A. The target-fresh-air-quantity and EGR-quantity computing section 106A computes a target torque and a target fresh-air quantity and a target EGR quantity for realizing the temperature and pressure in the target cylinder 9 under an optional operating condition in accordance with the accelerator pedal 32 and the target boost TgBoost. Specifically, the target fresh-air quantity TgAir is decided in accordance with the accelerator opening Apo and engine speed Ne by referring to a map and output to the target-intake-valve-opening-timing computing section 109 and target-intake-valve-opening-timing computing section 110.

Moreover, the target EGR quantity TgEgr under compressive self-ignition is set in accordance with the accelerator opening Apo and engine speed Ne by referring to a map, and the differential pressure DeltaP between the internal pressures of the intake pipe 6 and cylinder 9 is decided in accordance with the target EGR quantity TgEgr and engine speed Ne by referring to a map and they are output to the target-intake-valve-opening-timing computing section 109 and target-intake-valve-closing-timing computing section 110.

Furthermore, the target gas quantity TgGas is obtained from the target EGR quantity TgEgr and target fresh-air quantity TgAir, and the filling efficiency ItaGas is decided in accordance with the maximum gas quantity MaxGas obtained from the engine speed Ne and the target gas quantity TgGas and they are output to the target-exhaust-valve-opening-timing computing section 107 and target-exhaust-valve-closing-timing computing section 108.

The target-exhaust-valve-opening-timing computing section 107, target-exhaust-valve-closing-timing computing section 108, target-intake-valve-opening-timing computing section 109, and target-intake-valve-closing-timing computing section 110 are the same as those of the first embodiment.

Figure 24:
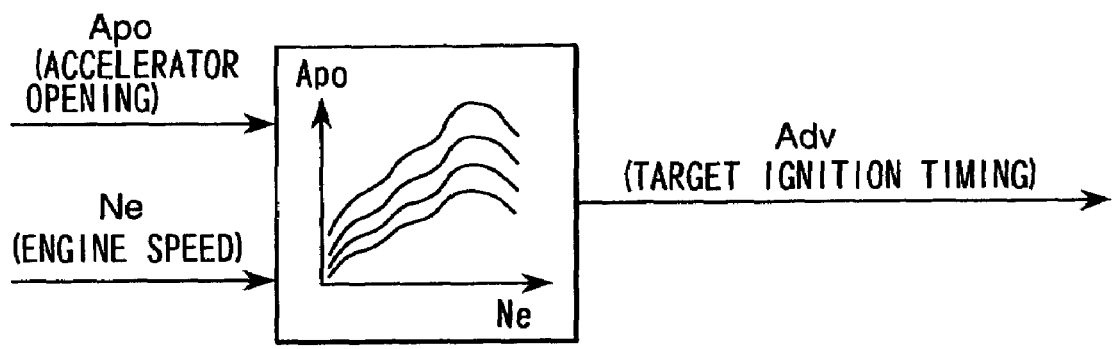
FIG. 24 is an illustration of the target-ignition-timing computing section in FIG. 19.

FIG. 24 is an illustration for calculation of a target ignition timing by the target-ignition-timing computing section 111A. The target-ignition-timing computing section 111A computes a target ignition timing when a misfire also occurs under compressive-self-ignition combustion in accordance with signals of the air-flow sensor 2, crank-angle sensor 15, and accelerator pedal 32. Specifically, the target ignition timing Adv is set in accordance with the accelerator opening Apo and engine speed Ne by referring to a map and output to the ignition plug 8. The target ignition timing is selected at more retard side than a compressive-self-ignition timing.

Figure 25:
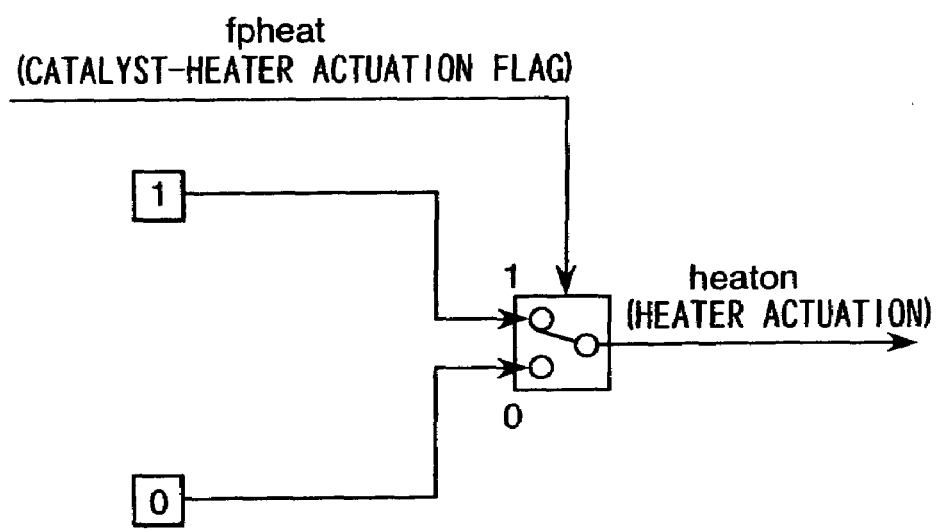
FIG. 25 is an illustration of the catalyst-heater control section in FIG. 19.

FIG. 25 is an illustration for a heater operation by the catalyst heater control section 122. The catalyst heater control section 122 is changed by the catalyst-heater-operation flag fpheat to operate the catalyst heater 35 when the catalyst-heater-operation flag fpheat is set to 1 and stop the operation of the catalyst heater 35 when the flag is not set to 1.

FIGS. 26 to 31 show the engine control equipment of the third embodiment, which is the same as the engine control equipments 100 and 100A of the first and second embodiments except the configuration of the catalyst control means 150. Therefore, the above point is described below in detail.

Figure 26:
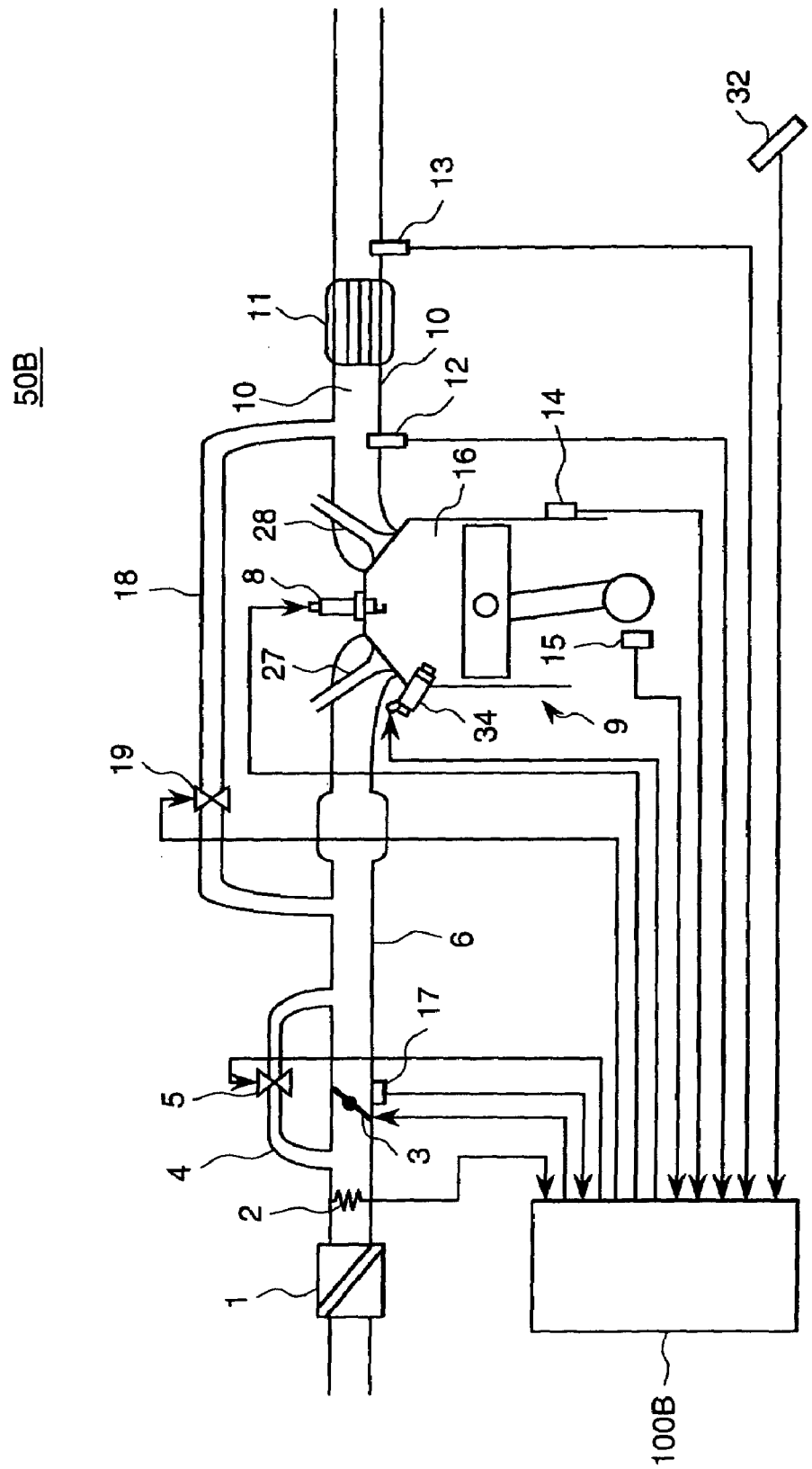
FIG. 26 is a general block diagram of an engine control system provided with an engine control equipment of third embodiment of the present invention.

FIG. 26 shows the general configuration of an engine control system provided with the engine control equipment of the third embodiment of the present invention, in which a fuel injection valve 34 is set to a cylinder 9 of an engine 50B. The fuel injection valve 34 injects fuel in the cylinder 9 when the temperature of a catalyst 11 is a predetermined value or lower in accordance with an output signal of an engine control equipment (control unit) 100B to activate the catalyst.

Figure 27:
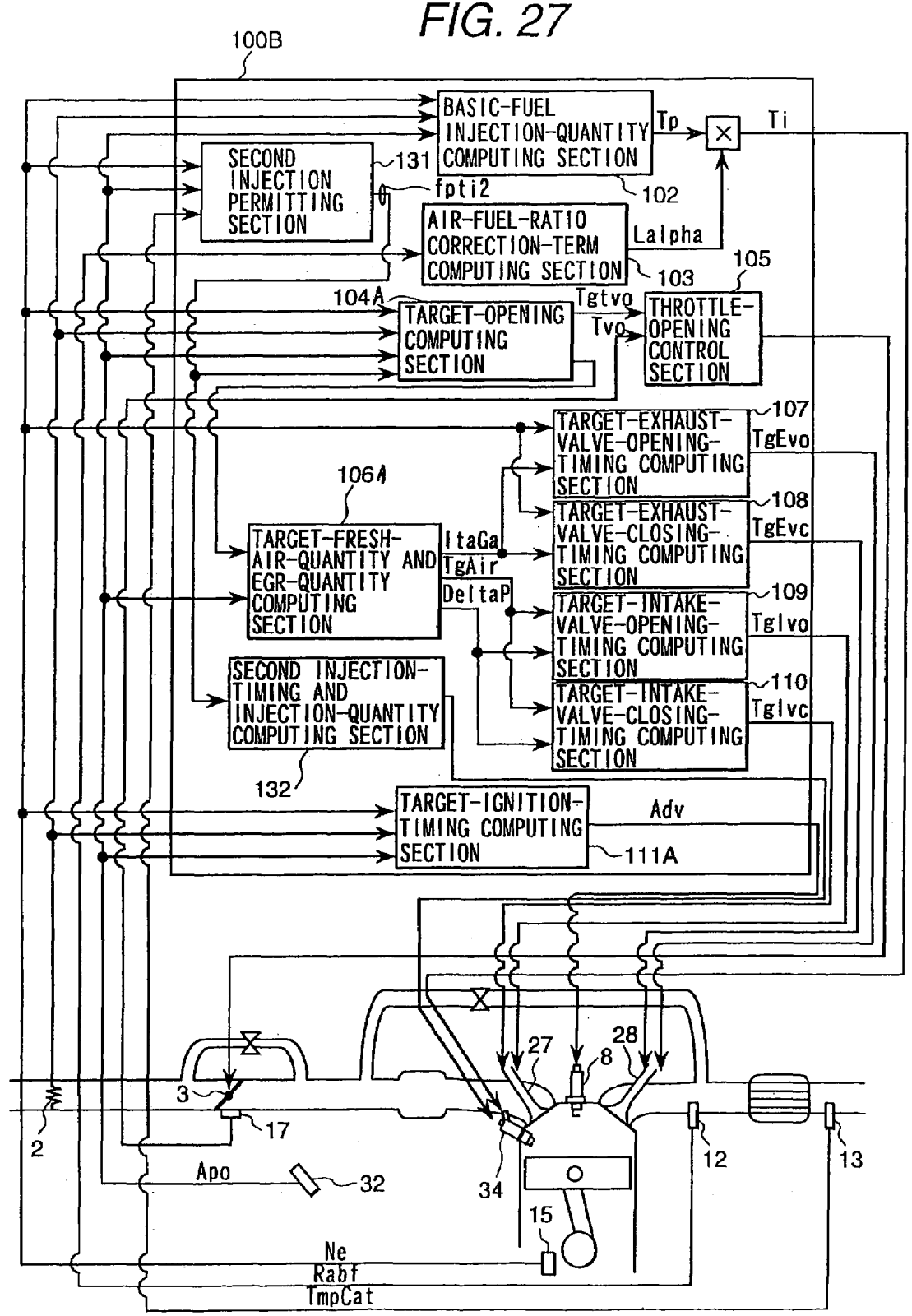
FIG. 27 is a control block diagram of the engine control equipment in FIG. 26.

FIG. 27 shows a control block diagram of the control unit 100B. The catalyst control means 150 of the control unit 100B injects surplus fuel in the explosion and exhaust strokes of an engine when the temperature of the catalyst 11 is equal to or lower than a predetermined value, causes oxidation in the cylinder 9, exhaust pipe 10, and catalyst 11, and activates the catalyst 11 by the heat due to the oxidation. Moreover, the control unit 100B is constituted of a second injection permitting section 131 which is one mode of the catalyst-state determining means 200, a basic-fuel-injection-quantity computing section 102, an air-fuel-ratio-correction-term computing section 103, a target-opening computing section 104A, a throttle-opening control section 105, a target-fresh-air-quantity and EGR-quantity computing section 106A, a target-exhaust-valve-opening-timing computing section 107, a target-exhaust-valve-closing-timing computing section 108, a target-intake-valve-opening-timing computing section 109, a target-intake-valve-closing-timing computing section 110, a target-ignition-timing computing section 111A, and a second injection-timing and injection-quantity computing section 132 which is one mode of the catalyst activating means 201. Each control block is described below in detail.

Figure 28:
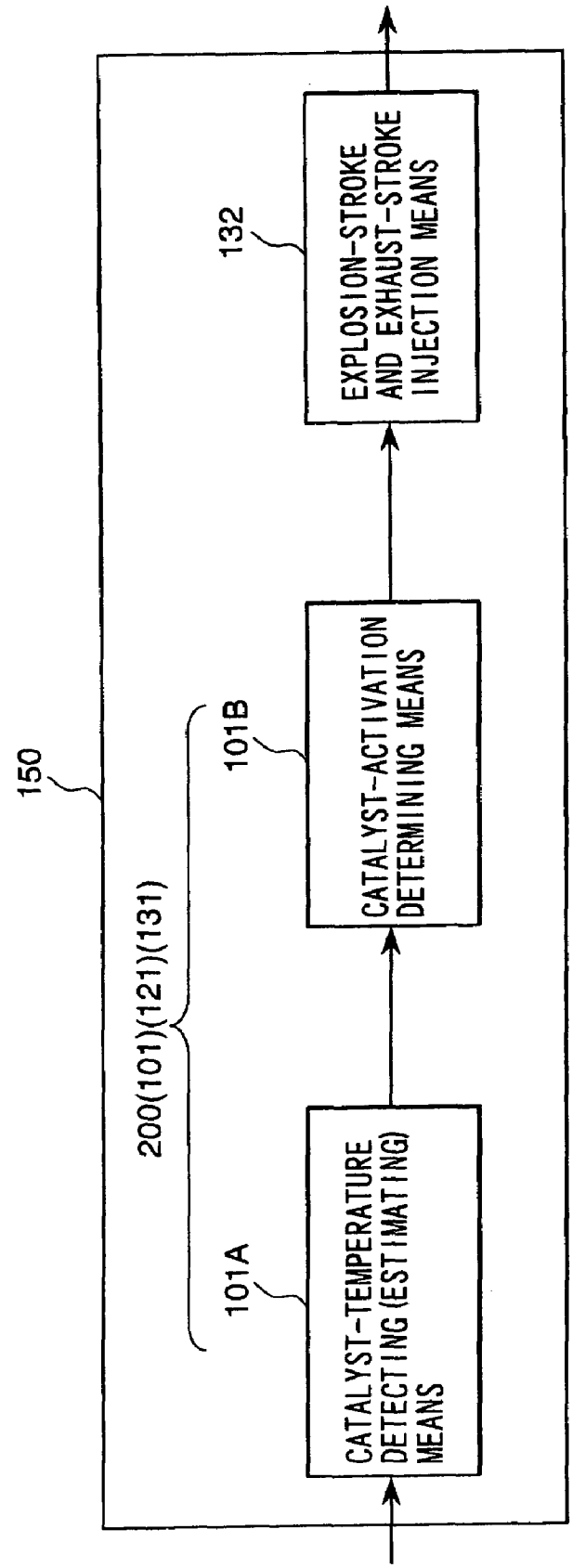
FIG. 28 is a control block diagram of the catalyst control means in FIG. 26.

FIG. 28 is a control block diagram of the catalyst control means 150 in the control unit 100B.

The catalyst control means 150 conceptually includes the second injection permitting section 131 and explosion-stroke and exhaust-stoke injection means 132. The second injection permitting section 131 is constituted of catalyst-temperature detecting means 101A and catalyst activating means 101B and outputs a signal for detecting the temperature of the three-way catalyst 11 by the catalyst-temperature detecting means 101A in accordance with an output signal of a temperature sensor 13, determining the activation of the three-way catalyst 11 by the catalyst-activation determining means 101B in accordance with the detected temperature, and computing the injection timing and quantity of surplus fuel in explosion and exhaust strokes in accordance with the above determination result to a second injection-timing and injection-quantity computing section 132.

Figure 29:
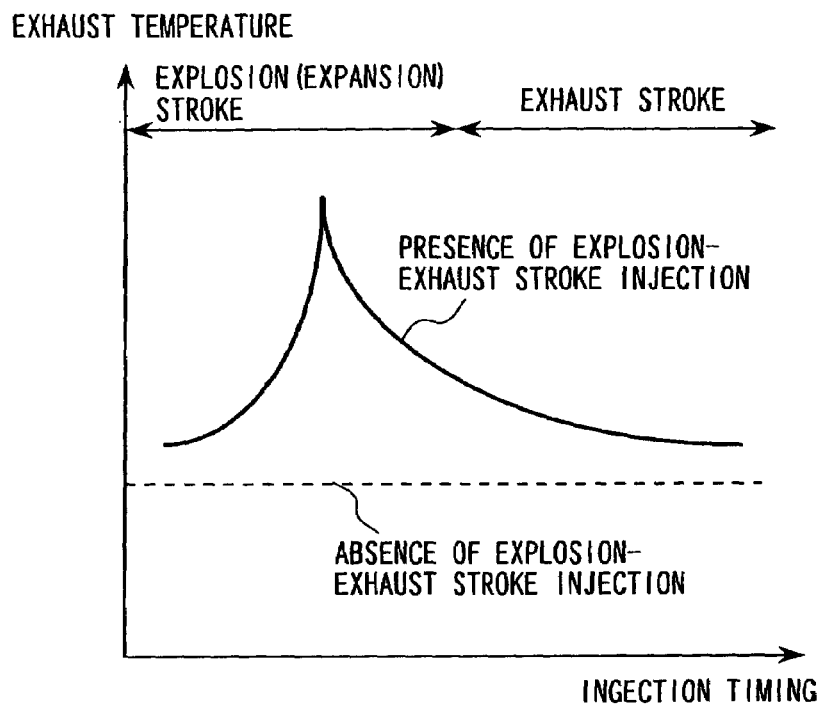
FIG. 29 is an illustration showing the relation between injection timing and exhaust-gas temperature in explosion and exhaust strokes.
Figure 30:
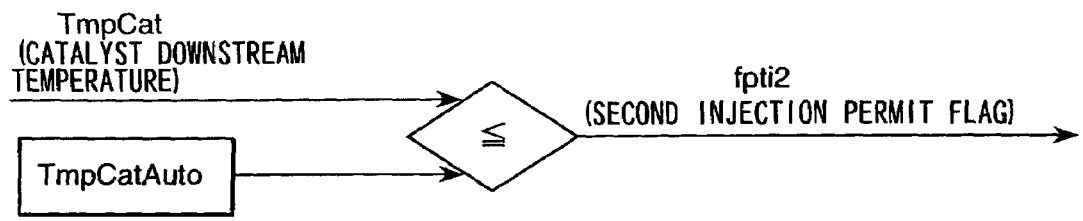
FIG. 30 is an illustration of the second injection permitting section in FIG. 27.

FIGS. 29 and 30 are illustrations for permission of injection of second fuel by the second injection permitting section 131, in which FIG. 29 shows the relation between the injection timing and the exhaust-gas temperature in the explosion and exhaust strokes. From FIG. 29, it is found that the peak of an exhaust-gas temperature is present in the explosion stroke when surplus fuel is injected in the explosion (expansion) and exhaust strokes (shown by a continuous line) compared to the case in which no surplus fuel is injected (shown by a broken line) and the exhaust-gas temperature rises until the exhaust stroke. This is because the fuel injected in the above strokes is oxidized in the exhaust pipe 10 or catalyst 11 and the exhaust-gas temperature is raised by the heat of the oxidation. Moreover, the second injection permitting section 131 for permitting the injection of the surplus fuel determines the permission of compressive self-injection in accordance with the downstream temperature TmpCat of the catalyst 11 as shown in FIG. 30. Specifically, when the condition of the following expression (11) is effectuated, the section 131 sets a second injection permit flag fpti2 to 0 but it does not second injection in the expansion and exhaust strokes. However, when the condition is not effectuated, the section 131 sets the second injection permit flag ftpi2 to 1 and performs second injection.

$$TmpCat \geq TmpCatAuto \qquad (11)$$

In this case, the expression (11) shows a catalyst activation state and the catalyst becomes inactive when the catalyst temperature TmpCat is lower than TmCatAuto.

The basic-fuel-injection-quantity computing section 102, air-fuel-ratio-correction-term computing section 103, throttle-opening control section 105, target-exhaust-valve-opening-timing computing section 107, target-exhaust-valve-closing-timing computing section 108, target-intakevalve-opening-timing computing section 109, and target-intake-valve-closing-timing computing section 110 are the same as those of the first embodiment and the catalyst-temperature detecting means 101A, target-fresh-air-quantity and EGR-quantity computing section 106A, and target-ignition-timing computing section 111A are the same as those of the second embodiment.

Figure 31:
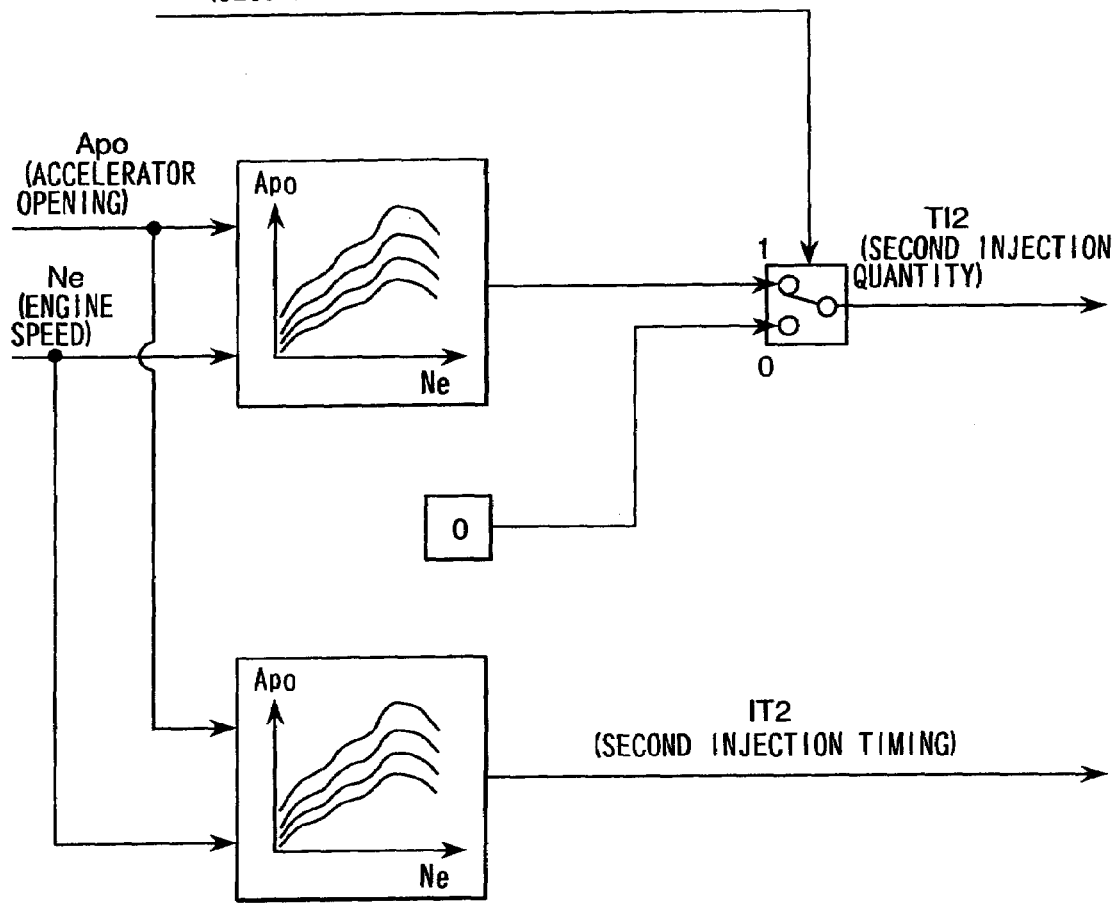
FIG. 31 is an illustration of the second injection-timing and injection-quantity computing section in FIG. 27.

FIG. 31 is an illustration for calculation of the second fuel-injection quantity and fuel-injection timing by the second injection-timing and injection-quantity computing section 132. The second injection-timing and injection-quantity computing section 132 computes the second fuel-injection quantity and fuel-injection timing in accordance with signals of the crank-angle sensor 15 and accelerator pedal 32. Specifically, the second injection quantity is set in accordance with the accelerator opening Apo and engine speed Ne by referring to a map and changed in accordance with the value of the second injection permit flag fpti2 to decide a second injection quantity TI2 and moreover, a second injection timing IT2 is decided in accordance with the accelerator opening Apo and engine speed Ne by referring to a map and they are output to the fuel injection valve 34 by which the second injection is performed. A technique is used which experientially decides the value of a map in accordance with the performance of an engine.

As described above, embodiments of the present invention have the following functions by using the above configuration.

That is, the engine control equipment of this embodiment has the catalyst control means 150 for accelerating the activation of the three-way catalyst 11 in accordance with output signals of the temperature sensor 13 at the downstream side of the three-way catalyst 11 and the like, the catalyst control means 150 of the engine control equipment 100 of the first embodiment has the compressive-self-ignition-combustion permitting section 101 for inhibiting the combustion according to compressive self-ignition, changes the combustion to the combustion according to spark ignition to perform the combustion when the temperature of the catalyst 11 is equal to or lower than a predetermined value and the compressive-self-ignition inhibiting means 111, and the compressive-self-ignition-combustion permitting section 101 is constituted of the catalyst-temperature detecting means 101A for detecting the temperature of the three-way catalyst 11 and the catalyst-activation determining means 101B for determining the activation of the three-way catalyst 11 in accordance with the temperature to change the combustion to the combustion according to spark ignition whose exhaust-gas temperature is higher than that of the compressive-self-ignition combustion and activate the three-way catalyst 11 by the exhaust-gas temperature. Therefore, it is possible to shorten the time from start of an engine up to activation of a catalyst by always activating the three-way catalyst 11, prevent exhaust gas from deteriorating even for a combustion system by a compressive-self-ignition engine whose combustion temperature is low because compressive self-ignition is not performed when the three-way catalyst 11 is inactive, and improve the reliability of the engine.

Moreover, the catalyst control means 150 of the engine control equipment 100A of the second embodiment has the heater-operation permitting section 121 for driving the catalyst heater 35 when the temperature of the catalyst 11 is equal to or lower than a predetermined value and the catalyst-temperature raising means 122. The heater-operation permitting section 121 is constituted of the catalyst-temperature detecting means 101a for detecting the temperature of the three-way catalyst 11 and the catalyst-activation determining means 101B for determining the activation of the three-way catalyst 11 in accordance with the detected temperature, which changes to the driving of the catalyst heater 35 in accordance with an output signal of the temperature sensor 13 to activate the catalyst 11. Therefore, it is possible to shorten the time from start of an engine up to activation of a catalyst and prevent exhaust gas from deteriorating even for a combustion system by a compressive-self-ignition engine.

Furthermore, the catalyst control means 150 of the engine control equipment 100B of the third embodiment has the second injection permitting section 131 for injecting surplus fuel in the explosion and exhaust stroke of an engine when the temperature of the catalyst 11 is equal to or lower than a predetermined value and the explosion-and-exhaust-stroke injecting means 132. The second injection permitting section 131 is constituted of the catalyst-temperature detecting means 101A for detecting the temperature of the three-way catalyst 11 and the catalyst-activation determining means 101B for determining the activation of the three-way catalyst 11 in accordance with the detected temperature, which causes oxidation in the cylinder 9, exhaust pipe 10, and catalyst 11 in accordance with an output signal of the temperature sensor 13 and activate the catalyst 11 by the heat of the oxidation. Therefore, also in this case, it is possible to shorten the time from start of an engine up to activation of a catalyst and prevent exhaust gas from deteriorating even for a combustion system by a compressive-self-ignition engine.

Three embodiments of the present invention are described above. However, the present invention is not restricted to the embodiments. Various modifications are permitted through design as long as they are not deviated from the gist of the present invention described in claims.

For example, the catalyst-temperature detecting means 101A detects the temperature of the three-way catalyst 11 from the temperature sensor 13 set to the downstream side of the catalyst 11. However, it is also permitted to use means for estimating the temperature of the three-way catalyst 11 in accordance with various operation parameters of the airflow sensor 2 and crank-angle sensor 15. Also in this case, the same advantage can be obtained.

Figure 32:
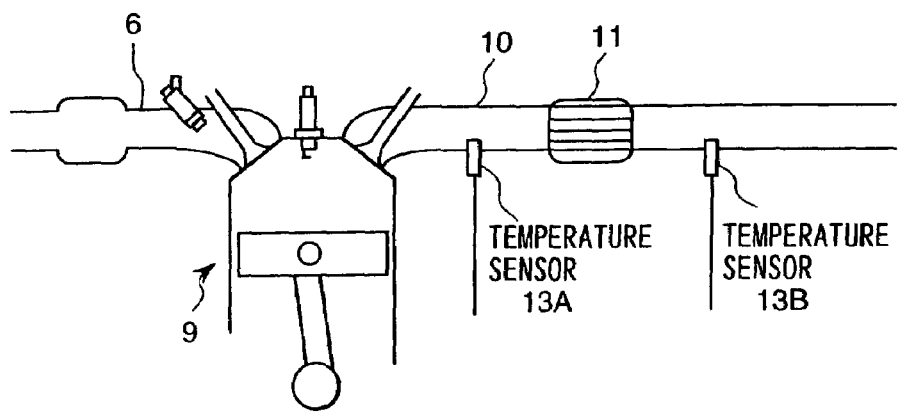
FIG. 32 is a block diagram of the engine of another embodiment.

Moreover, the engine control equipment of each of the above embodiments accelerates the activation of the catalyst 11 in accordance with output signals of the A/F sensor 2 set to the upstream side of the three-way catalyst 11 and the temperature sensor 13 set to the downstream side of the catalyst 11. As shown in FIG. 32, however, it is also possible to accelerate the activation of the catalyst 11 in accordance with output signals of the temperature sensors 13A and 13B set to the upstream side and downstream side of the three-way catalyst 11. In this case, it is possible to more-accurately detect the temperature of the catalyst 11.

Figure 33:
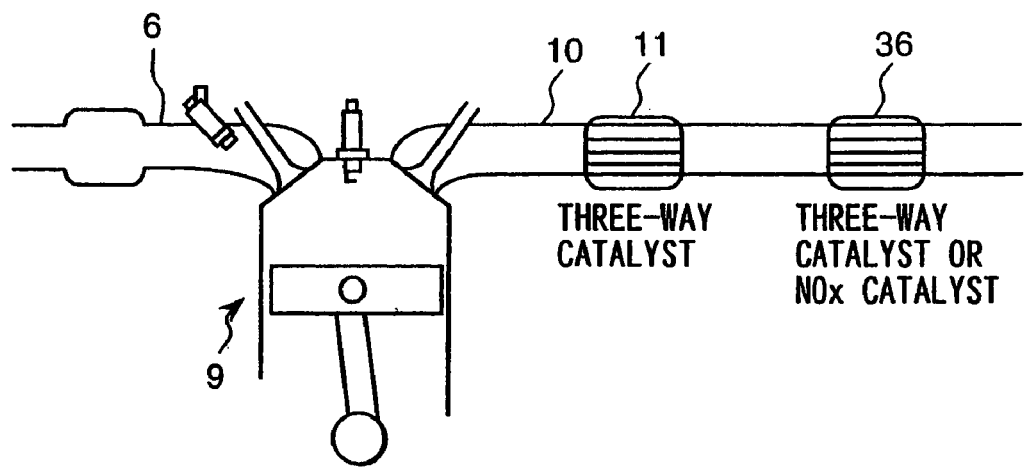
FIG. 33 is a block diagram of the engine of still another embodiment.
Figure 34:
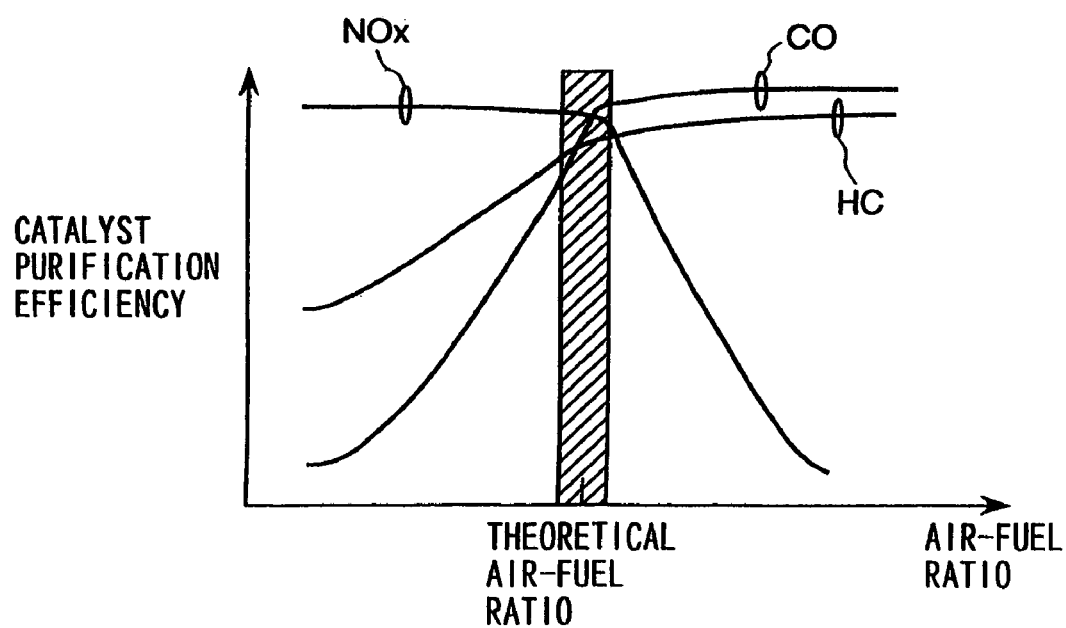
FIG. 34 is a characteristic diagram of a three-way catalyst to an air-fuel ratio.
Figure 35:
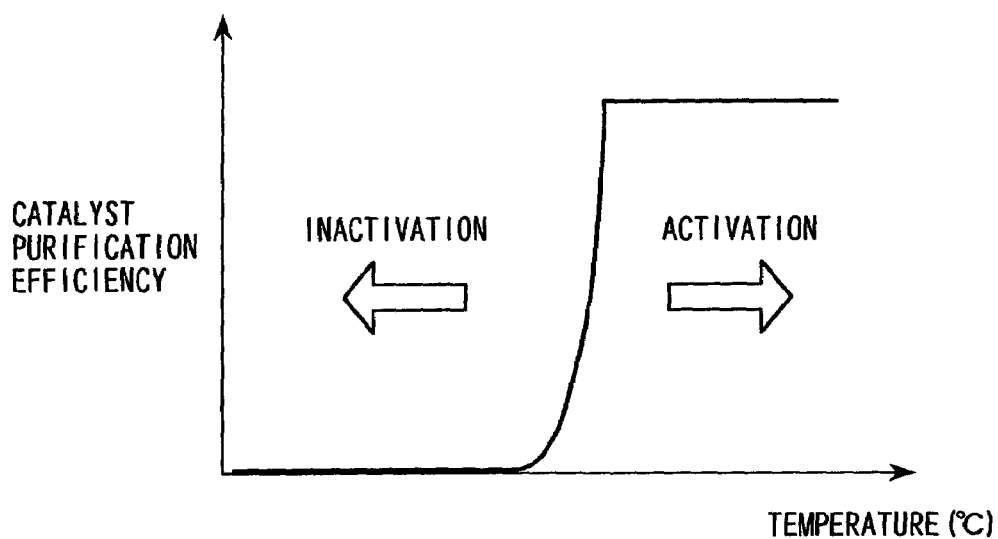
FIG. 35 is a characteristic diagram of a three-way catalyst to temperature.
Figure 36:
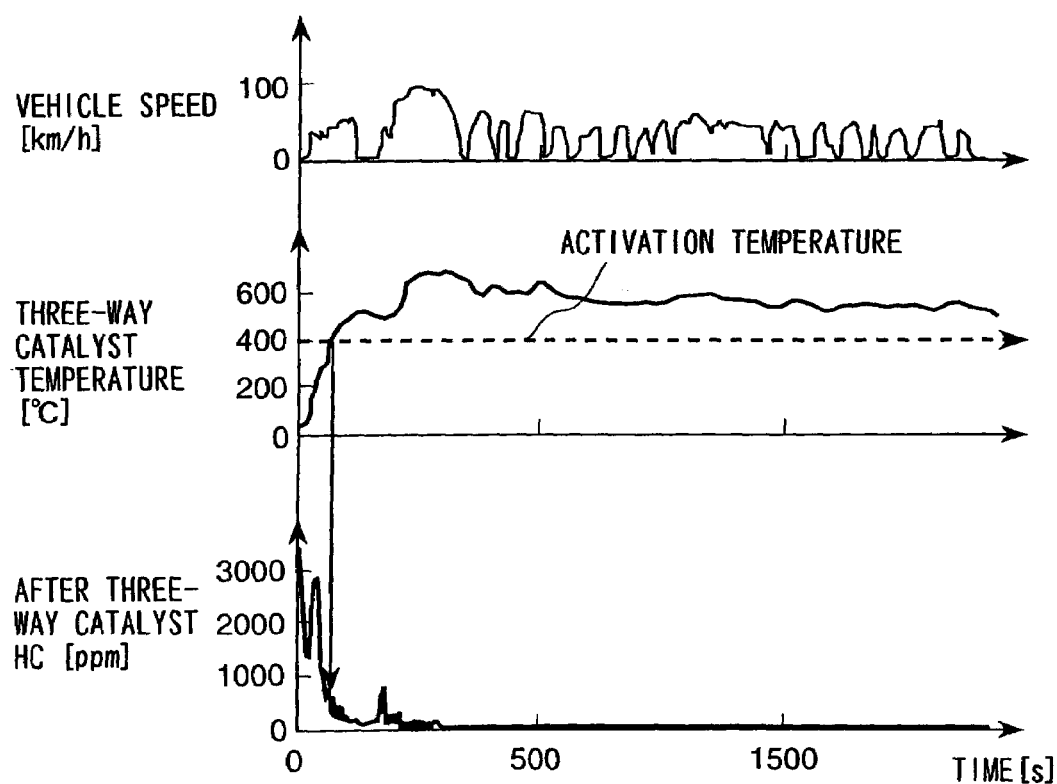
FIG. 36 is an illustration showing the change of activation temperature of a three-way catalyst and HC quantity passing through the three-way catalyst.

Furthermore, as shown in FIG. 33, it is permitted to use a configuration having the three-way catalyst 11 or NOx catalyst 36 at the downstream side of the three-way catalyst 11, that is, a configuration having a plurality of three-way catalysts or a configuration obtained by combining a three-way catalyst with an NOx catalyst. Furthermore, it is permitted to use a configuration obtained by combining a three-way catalyst with an HC adsorption catalyst. Also in this case, the same advantage can be obtained.

Furthermore, in the case of the above embodiments, though the intake and exhaust valves 27 and 28 respectively use a lift-timing-control electromagnetic driving valve, it is also permitted to apply the valves to a phase-control-type driving valve or it is permitted to use an engine control system not using the electric-control throttle valve 3. For example, control by only the intake valve 27 and exhaust valve 28 can be executed.

As understood from the above explanation, an engine control equipment of the present invention determines whether a catalyst is active in a compressive-self-ignition engine and when the catalyst is inactive, quickly activates the catalyst. Therefore, it is possible to shorten the time from start of an engine up to activation of a catalyst and control deterioration of exhaust gas.

The invention claimed is:

1. Engine control equipment having a catalyst for burning a mixed gas in a combustion chamber by compression self-ignition and purifying exhaust gas components in the combustion chamber, comprising means for controlling the catalyst, including means for determining the activated state of the catalyst and means for activating the catalyst in accordance with the determination so as to inhibit the compression self-ignition and performing spark ignition in the combustion chamber until the catalyst is activated sufficiently.

2. The engine control equipment according to claim 1, wherein the means for activating the catalyst is configured to control the state of an engine when the detected or estimated temperature of the catalyst is equal to or lower than a predetermined value.

3. The engine control equipment according to claim 1, wherein the catalyst uses a three-way catalyst or NOx catalyst provided for an exhaust pipe.

4. The engine control equipment according to claim 1, wherein the means for determining the activated state of the catalyst includes means for detecting or estimating the temperature of the catalyst and means for determining the activation of the catalyst.

5. The engine control equipment according to claim 4, wherein the means for activating the catalyst controls the state of an engine when the detected or estimated temperature of the catalyst is equal to or lower than a predetermined value.

6. The engine control equipment according to claim 1, wherein the spark ignition is performed when the detected or estimated temperature of the catalyst is equal to or lower than a predetermined value.

7. The engine control equipment according to claim 6, wherein the means for determining the activated state of the catalyst is provided with means for detecting or estimating the temperature of the catalyst and means for determining the activation of the catalyst.

8. The engine control equipment according to claim 7, wherein the means for activating the catalyst controls the state of an engine when the detected or estimated temperature of the catalyst is equal to or lower than a predetermined value.

9. The engine control equipment according to claim 1, wherein the means for activating the catalyst drives a heater for the catalyst when the detected or estimated temperature of the catalyst is equal to or lower than a predetermined value.

10. The engine control equipment according to claim 9, wherein the means for determining the activated state of the catalyst is provided with means for detecting or estimating the temperature of the catalyst and means for determining the activation of the catalyst.

11. The engine control equipment according to claim 10, wherein the means for activating the catalyst controls the state of an engine when the detected or estimated temperature of the catalyst is equal to or lower than a predetermined value.

12. The engine control equipment according to claim 1, wherein the means for activating the catalyst injects a fuel at the timing other than normal fuel injection when the detected or estimated temperature of the catalyst is equal to or lower than a predetermined value.

13. The engine control equipment according to claim 12, wherein the means for activating the catalyst injects the fuel in the explosion or exhaust stroke of the engine in accordance with the temperature of the catalyst.

14. The engine control equipment according to claim 12, wherein the means for determining the activated state of the catalyst is provided with means for detecting or estimating the temperature of the catalyst and means for determining the activation of the catalyst.

15. The engine control equipment according to claim 14, wherein the means for activating the catalyst controls the state of an engine when the detected or estimated temperature of the catalyst is equal to or lower than a predetermined value.

16. The engine control equipment according to claim 1, wherein the control equipment is controlled so as to early start combustion by the compressive self-ignition when the temperature detected by a temperature sensor provided to the upstream or downstream side of the catalyst becomes a predetermined value or more.

17. The engine control equipment according to claim 16, wherein the means for activating the catalyst injects a fuel at the timing other than normal fuel injection when the detected or estimated temperature of the catalyst is equal to or lower than a predetermined value.

18. The engine control equipment according to claim 17, wherein the means for activating the catalyst injects the fuel in the explosion or exhaust stroke of the engine in accordance with the temperature of the catalyst.

19. The engine control equipment according to claim 18, wherein the catalyst uses a three-way catalyst or NOx catalyst provided for an exhaust pipe.

20. Engine control equipment having a catalyst for burning a mixed gas in a combustion chamber by compression self-ignition and purifying exhaust gas components in the combustion chamber, comprising a catalyst controller configured to determine an activated catalyst state and a catalyst activator operative to activate the catalyst based upon the determined catalyst state such that compression self-ignition is inhibited and spark ignition is performed in the combustion chamber until the catalyst is activated sufficiently.

21. The engine control equipment according to claim 20, wherein the controller is configured to effect the spark ignition and inhibit the compression self-ignition at a detected or estimated catalyst temperature equal to or lower than a predetermined value.

* * * * *